US011999337B2

(12) United States Patent
Austermeier et al.

(10) Patent No.: US 11,999,337 B2
(45) Date of Patent: Jun. 4, 2024

(54) PEDAL EMULATOR FOR A VEHICLE

(71) Applicant: Hella GmbH & Co. KGaA, Lippstadt (DE)

(72) Inventors: Werner Austermeier, Schloß Holte-Stukenbrock (DE); Dennis Mark Burke, Canton, MI (US); Kerim Florian Huge, Paderborn (DE); Andreas Mueller, Lippstadt (DE); Ralf Ridder, Lippstadt (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 416 days.

(21) Appl. No.: 17/421,657

(22) PCT Filed: Jan. 16, 2020

(86) PCT No.: PCT/EP2020/051005
§ 371 (c)(1),
(2) Date: Jul. 8, 2021

(87) PCT Pub. No.: WO2020/152022
PCT Pub. Date: Jul. 30, 2020

(65) Prior Publication Data
US 2022/0089135 A1   Mar. 24, 2022

(30) Foreign Application Priority Data
Jan. 23, 2019   (DE) ..................... 10 2019 101 646.0

(51) Int. Cl.
*B60T 8/40*     (2006.01)
*B60K 26/02*    (2006.01)
(Continued)

(52) U.S. Cl.
CPC ............ *B60T 8/409* (2013.01); *B60K 26/021* (2013.01); *B60T 7/042* (2013.01); *B60T 7/06* (2013.01); *G05G 1/44* (2013.01); *G05G 5/03* (2013.01)

(58) Field of Classification Search
CPC . B60T 8/409; B60T 7/042; B60T 7/06; B60K 26/021; G08G 1/44; G08G 5/03
See application file for complete search history.

(56) References Cited

U.S. PATENT DOCUMENTS 3,739,579 A * 6/1973 Lutz ........................ F16D 65/38
                                                        74/516
4,005,617 A * 2/1977 Sourbel .................. G05G 1/405
                                                        74/516
(Continued)

FOREIGN PATENT DOCUMENTS

DE   102015218956 A1    3/2017
DE   102017103994 A1   10/2017
(Continued)

*Primary Examiner* — Robert A. Siconolfi
*Assistant Examiner* — James K Hsiao
(74) *Attorney, Agent, or Firm* — Husch Blackwell LLP

(57) ABSTRACT

A pedal emulator for a vehicle is provided comprising a base part for mounting the pedal emulator to a structure of the vehicle. A pedal lever is pivotable around a rotary axis of the base part. A force generation unit exerts a counterforce on the pedal lever by means of at least one coupling element for mechanically coupling the force generation unit with the pedal lever. The counterforce works counter to an actuating force exerted on the pedal lever. The force generation unit and the coupling element are designed and arranged in such a way that a progression of the counterforce along a pedal travel of the pedal lever (6) takes the form of a non-linear progression in a pedal travel-counterforce diagram.

17 Claims, 13 Drawing Sheets

(51) Int. Cl.
  *B60T 7/04* (2006.01)
  *B60T 7/06* (2006.01)
  *G05G 1/44* (2008.04)
  *G05G 5/03* (2008.04)

(56) References Cited

U.S. PATENT DOCUMENTS

| | | | | |
|---|---|---|---|---|
| 4,784,442 A * | 11/1988 | Petersen | B60T 13/662 | 303/50 |
| 5,010,782 A * | 4/1991 | Asano | B60T 7/06 | 74/513 |
| 5,460,061 A * | 10/1995 | Redding | B60K 26/02 | 74/513 |
| 5,544,948 A * | 8/1996 | Schmidt | B60T 7/042 | 60/566 |
| 6,360,631 B1 * | 3/2002 | Wortmann | G05G 5/03 | 267/209 |
| 6,367,886 B1 * | 4/2002 | Shaw | B60T 8/4086 | 303/50 |
| 6,464,306 B2 * | 10/2002 | Shaw | B60T 7/042 | 303/3 |
| 6,722,225 B1 * | 4/2004 | Martinovsky | G05G 1/00 | 74/513 |
| 6,732,517 B2 * | 5/2004 | Zehnder | B60T 8/38 | 92/165 PR |
| 7,093,515 B2 * | 8/2006 | Yamanoi | B60R 22/48 | 74/513 |
| 7,383,752 B2 * | 6/2008 | Suzuki | G05G 1/36 | 180/274 |
| 7,401,865 B2 * | 7/2008 | Shaw | B60T 7/042 | 303/3 |
| 7,421,927 B2 * | 9/2008 | Terradas | B60T 11/08 | 74/512 |
| 8,166,755 B2 * | 5/2012 | Jeanson | F02D 23/02 | 92/92 |
| 8,522,640 B2 * | 9/2013 | Bryce | B60T 7/042 | 74/519 |
| 8,631,694 B2 * | 1/2014 | Vollert | B60T 17/221 | 73/132 |
| 9,079,570 B2 * | 7/2015 | Sellinger | B60T 13/662 | |
| 9,511,750 B2 * | 12/2016 | Rizzini | G05G 1/04 | |
| 10,137,874 B2 * | 11/2018 | Pennala | B60T 7/042 | |
| 10,166,954 B2 * | 1/2019 | Houtman | B60T 7/042 | |
| 10,343,657 B2 * | 7/2019 | Street | B60T 7/042 | |
| 11,597,366 B2 * | 3/2023 | Street | G05G 1/38 | |
| 11,803,206 B2 * | 10/2023 | Cuthbertson | G05G 1/06 | |
| 2001/0043009 A1 * | 11/2001 | Anderson | G05G 5/03 | 303/3 |
| 2004/0040408 A1 * | 3/2004 | Shaw | G05G 1/42 | 74/560 |
| 2004/0259687 A1 * | 12/2004 | Ritter | B60K 26/021 | 477/187 |
| 2005/0082909 A1 * | 4/2005 | Constantakis | B60T 8/3255 | 303/20 |
| 2009/0095100 A1 * | 4/2009 | Toyohira | B60T 8/4081 | 74/110 |
| 2011/0226086 A1 | 9/2011 | Kirchner | | |
| 2012/0007419 A1 * | 1/2012 | Sellinger | B60T 8/409 | 303/15 |
| 2014/0116193 A1 * | 5/2014 | Jeon | G05G 5/03 | 74/519 |
| 2014/0138888 A1 * | 5/2014 | Kim | G05G 5/03 | 267/140.13 |
| 2014/0360177 A1 * | 12/2014 | Ryu | G05G 5/03 | 60/556 |
| 2015/0277479 A1 * | 10/2015 | Viethen | G05G 1/44 | 74/560 |
| 2016/0339886 A1 * | 11/2016 | MacArthur | B60T 8/4081 | |
| 2017/0168519 A1 * | 6/2017 | Alf | G05G 5/05 | |
| 2017/0327097 A1 * | 11/2017 | Saito | B60T 13/686 | |
| 2017/0351291 A1 * | 12/2017 | Schoenfuss | B60T 7/042 | |
| 2018/0039298 A1 * | 2/2018 | Adoline | G05G 5/03 | |
| 2018/0086204 A1 * | 3/2018 | Hoshino | G05G 1/30 | |
| 2018/0244251 A1 * | 8/2018 | Masuda | B60T 11/236 | |
| 2018/0283967 A1 * | 10/2018 | Kato | G05G 1/38 | |
| 2019/0375387 A1 * | 12/2019 | Anderson | B60T 11/18 | |

FOREIGN PATENT DOCUMENTS

| | | |
|---|---|---|
| DE | 102017122080 A1 | 4/2018 |
| EP | 1877886 A1 | 1/2008 |
| EP | 3222456 A1 | 9/2017 |
| WO | 2014048661 A1 | 4/2014 |

* cited by examiner

PEDAL EMULATOR FOR A VEHICLE

CROSS REFERENCE

This application claims priority to PCT Application No. PCT/EP2020/051005, filed Jan. 16, 2020, which itself claims priority to German Application No. 10 2019 101646.0, filed Jan. 23, 2019, the entirety of both of which are hereby incorporated by reference

FIELD OF THE INVENTION

The present invention relates to a pedal emulator for a vehicle.

BACKGROUND OF THE INVENTION

Numerous versions of pedal emulators designed as "X-by wire" pedals, such as brake by wire pedals, are already known from the state of the art in numerous embodiment versions. Brake-by-wire pedals are pedals where there no longer is a direct operative connection between the pedal on the one hand and the actuator on the other, as is the case with a conventional pedal. With a conventional brake pedal, the brake pedal has a direct operative connection with the brakes, for example by means of a hydraulic system. Such direct operative connections are no longer present with a brake-by-wire pedal. Instead, a rotary movement of a pedal lever around a rotary axis, for example, is recorded by sensors, transformed into an output signal and used to actuate the vehicle's brake system. A pedal emulator now serves to simulate the haptic impressions that actually exist with a conventional pedal so that the user of a brake-by-wire pedal is given the impression that they are using a conventional brake pedal of the kind they are used to.

Such a pedal emulator for a vehicle is already known from DE 10 2017 122 080 A1, for example. The pedal emulator known from this patent comprises a base part for mounting the pedal emulator to a structure of the vehicle, a pedal lever pivotable around a rotary axis of the base part, a force generation unit for exerting a counterforce on the pedal lever by means of at least one coupling element for mechanically coupling the force generation unit with the pedal lever, where the counterforce works counter to an actuating force exerted on the pedal lever and where the force generation unit and the coupling element are designed and arranged in such a way that a progression of the counterforce along a pedal travel of the pedal lever takes the form of a non-linear progression in a pedal travel-counterforce diagram.

This is where the present invention comes in.

BRIEF SUMMARY OF THE INVENTION

The task underlying the present invention is to provide a pedal emulator for a vehicle that facilitates a compact and simple design.

This task is solved by a pedal emulator for a vehicle in which the force generation unit and the coupling element for generating the non-linear progression of the counterforce along the pedal travel feature a plurality of solely mechanical means. The subclaims address advantageous refinements of the invention.

One material advantage of the inventive pedal emulator is, in particular, the fact that the inventive pedal emulator for a vehicle facilitates a compact and simple design. Dispensing with hydraulic or pneumatic systems, for example, further has the advantage that the handling of fluids, which involves additional expense, effort and problems, is no longer required.

In terms of type, functioning, dimensions, material, shape, arrangement and number, the plurality of mechanical means can, in principle, be selected at will within wide suitable limits. One advantageous refinement of the inventive pedal emulator specifies that the plurality of mechanical means features at least one spring. Springs are available in a wide variety of embodiments and can be deployed in a large number of differing applications. Potential energy can be stored using springs. The term spring should be interpreted broadly in this context and comprises all kinds of elastic elements.

One advantageous refinement of the aforementioned embodiment of the inventive pedal emulator specifies that the plurality of mechanical means features a plurality of springs, where a first spring and a second spring of the plurality of springs take the form of springs connected in parallel or springs connected in series. This means that force generation in the force generation unit can be designed in a very flexible way, firstly by selecting suitable springs and secondly using a combination of the same. Correspondingly, a large number of conceivable applications can be covered by means of standard springs available on the market.

One especially advantageous refinement of the last-mentioned embodiment specifies that at least the first or the second spring takes the form of a leaf spring. Leaf springs demonstrate very great flexibility with regard to the choice of contours, width and thickness and thus the spring constant that can be set using them. Furthermore, leaf springs provide high force absorption while requiring little installation space. When connected to another spring in series, for example, a leaf spring offers a gradual force progression without identifiable force surges in the force progression.

A further advantageous refinement of the inventive pedal emulator specifies that at least one of the at least one springs, acts together with at least one lever to transmit force, where the respective lever is designed for achieving a direct or, in the case of a coupling element designed as a lever, indirect force transmission connection with the pedal lever. This makes it possible, using a particularly simple design, to deploy various leverage ratios to generate a desired progression of the counterforce introduced into the pedal lever by means of the force generation unit in a pedal travel-counterforce diagram. It is possible, for example, to change the leverage ratio at the respective lever in the desired manner depending on the pedal travel of the pedal lever.

In principle, the at least one lever can be selected at will within wide suitable limits in terms of type, functioning, material, dimensions, shape, arrangement and number. One advantageous refinement of the aforementioned embodiment of the inventive pedal emulator specifies that the first spring and the second spring each act together with a lever to transmit force, where the lever connected with the first spring and the second spring to transmit force takes the form of a shared lever. This further simplifies the design. Furthermore, the space requirements of the inventive pedal emulator are further reduced.

One advantageous refinement of the inventive pedal emulator in accordance with the two last-mentioned embodiments specifies that the at least one lever features a longitudinal guide for another one of the plurality of mechanical means. This further improves the flexibility of the inventive pedal emulator. The at least one longitudinal guide makes it possible, for example, to change a force transmission point and a force direction of the other mechanical means in relation to the corresponding lever in the desired manner when the pedal lever is actuated.

One advantageous refinement of the inventive pedal emulator provides that the at least one lever takes the form of a plurality of levers, where the levers are designed and arranged to be coordinated with each other in such a way that the levers are not linked to each other in a force transmission connection in a first section of the pedal lever's movement and are linked to each other in a force transmission connection in a second section of the pedal lever's movement. This makes it possible to gradually add mechanical means from the plurality of mechanical means. It is conceivable, for example, that different springs from the force generation unit are gradually added in the aforementioned manner in order to achieve a desired progression of the counterforce in a pedal travel-counterforce diagram.

One advantageous refinement of the aforementioned embodiment of the inventive pedal emulator specifies that at least one of the levers features a carrier for carrying along at least one other of the plurality of levers. This makes it possible, for example, to implement the gradual addition of mechanical means from the plurality of mechanical means using an especially simple and robust design.

Another advantageous refinement of the inventive pedal emulator specifies that the pedal emulator features at least one stop for at least one of the at least one levers. This makes it possible, for example, to set the limits for a desired movement range for the respective lever using a simple and robust design. Furthermore, this makes it possible, using springs with great differences in spring constant arranged in series for example, to create a gradual counterforce progression in a pedal travel-counterforce diagram as the total spring constant in the aforementioned spring combination is essentially defined by the weaker spring. In contrast to this, it is also possible, of course, to implement a degressive course of the counterforce in a pedal travel-counterforce diagram by, for example, the spring travel of the stronger spring being limited.

One especially advantageous refinement of the inventive pedal emulator specifies that the plurality of mechanical means features at least one guide, where the guide takes the form of a slotted guide or a free surface. This determines a desired movement whose sequence can be reproduced in a particularly simple manner. When designed as a slotted guide, the guide features a closed contour whereas the guide designed as a free surface features an open contour.

One advantageous refinement of the aforementioned embodiment of the inventive pedal emulator specifies that the guide is designed as a slotted guide in which a guide block engages. In this way, the guide block is trapped in the closed contour of the slotted guide such that the guide takes on an especially secure form.

One advantageous refinement of the last-mentioned embodiment of the inventive pedal emulator specifies that the guide block is arranged at a free end of the at least one spring. This firstly makes it possible to change the force transmission point of the respective spring in relation to the slotted guide as desired along the pedal travel. Secondly, this makes it possible to change the compression and/or the effective direction of the spring force, i.e. the force direction, relative to the slotted guide along the pedal travel.

One advantageous refinement of the two last-mentioned embodiments of the inventive pedal emulator specifies that the guide block is arranged at at least one of the at least one coupling elements or at least one of the at least one levers. This makes it possible to adjust the leverage ratios of the respective coupling element or lever in a reproducible manner to the desired leverage ratio in a certain position of the pedal lever along the pedal travel of the pedal lever.

Instead of designing the guide as a slotted guide, another advantageous refinement of the inventive pedal emulator specifies that the guide takes the form of a free surface that engages with one of the at least one levers. This makes it possible to implement the guide for the relevant lever in a way that saves material and space. It is, however, also conceivable that with a plurality of guides, one part of the guides takes the form of a slotted guide and one part of the guides takes the form of a free surface.

One especially advantageous refinement of the inventive pedal emulator specifies that the force generation unit features a device for reducing or avoiding lateral forces acting crosswise to a main force direction of the force generation unit. This favors a defined, previously defined force application from the force generation unit into the pedal lever. Furthermore, this reduces an unwanted mechanical load on the force generation unit as well as the pedal lever. The main force direction of the force generation unit does not necessarily mean the main force direction of the force generation unit at which the force generation unit acts indirectly, namely by means of the at least one coupling element, on the pedal lever. For example, a main force direction of the force generation unit is also included with which the force generation unit directly acts on the at least one coupling element. The lateral forces to be reduced or avoided by means of the device are always disruptive forces and not the main force generated by the force generation unit.

One especially advantageous refinement of the aforementioned embodiment of the inventive pedal emulator specifies that the device for reducing or avoiding lateral forces features a spring acting crosswise to the main force direction of the force generation unit. This makes it possible for the device for reducing or avoiding lateral to be implemented in an especially simple design.

One other advantageous refinement of the inventive pedal emulator specifies that at least one virtual or real rotary axis of the at least one lever is identical to the rotary axis of the pedal lever. This further simplifies the design of the force generation unit of the inventive pedal emulator and further reduces its space requirements.

One further advantageous refinement of the inventive pedal emulator specifies that the force generation unit features at least one slide bearing for at least one of the at least one coupling elements or at least one of the at least one levers. This makes it possible to implement in a simple manner a desired movability of the coupling element or lever at a bearing point of this lever.

One especially advantageous refinement of the inventive pedal emulator specifies that the force generation unit or the force generation unit together with at least one of the at least one coupling elements takes the form of a separate assembly. This facilitates a modular design of the inventive pedal emulator. For example, the manufacture of the force generation unit designed as a separate assembly or the force generation unit designed as a separate assembly together with at least one of the at least one coupling elements can be outsourced to an external manufacturer. Furthermore, thanks to the modular design, adaptation to a plurality of different vehicle types from different vehicle manufacturers only requires the force generation unit or the force generation unit together with at least one of the at least one coupling elements to be modified.

One advantageous refinement of the aforementioned embodiment of the inventive pedal emulator specifies that the separate assembly features a housing, where the force generation unit is arranged in the housing and is transferable, linked by a force transmission connection with the pedal lever, by means of an aperture in the housing and the coupling element. This improves the handling of the inventive pedal emulator during storage transportation and manufacture of the vehicle. Over and above this, the housing is able to effectively protect the inventive pedal emulator, independently of the vehicle, from the penetration of dirt or the like into the interior of the housing and from other unwanted environmental influences.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
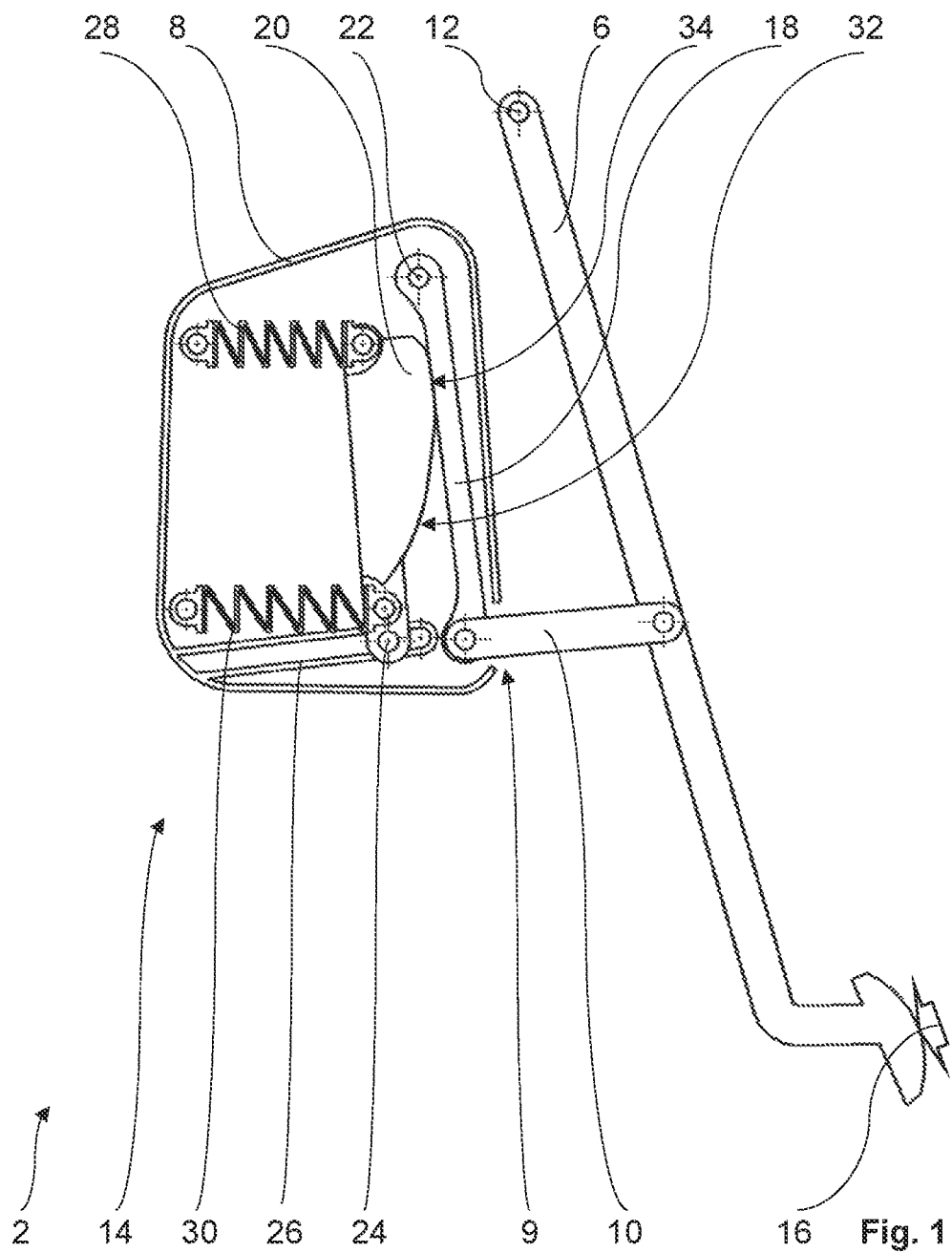
FIG. 1 is a first sample embodiment of the inventive pedal emulator in a crosssection side view with the pedal lever at a resting position.
Figure 2:
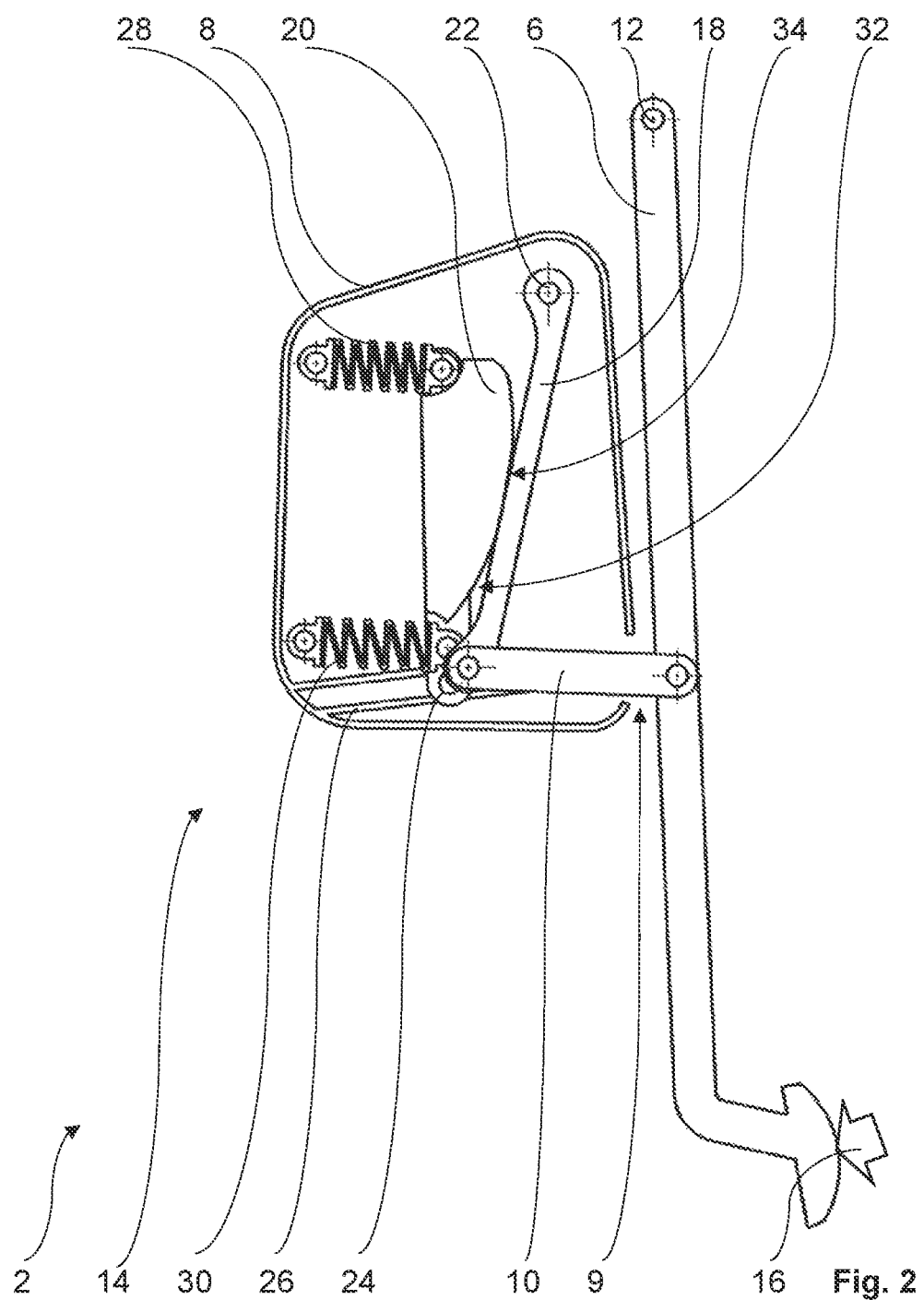
FIG. 2 shows the first sample embodiment from FIG. 1 in a further cross-section side view with the pedal lever at an actuating position.

FIG. 1 and FIG. 2 show a first sample embodiment of the inventive pedal emulator in a mounting position. The pedal emulator takes the form of a brake-by-wire brake pedal 2 (brake pedal 2 for short) of a vehicle (not shown).

The pedal emulator 2 comprises a pedal lever 6, a housing 8, a base part (not shown) for mounting the pedal emulator 2 to a structure of the vehicle (not shown) and a coupling element 10 in the form of a coupling rod for mechanical coupling of the pedal lever 6 pivotable around a rotary axis 12 with a force generation unit 14 arranged in the housing 8 for exerting a counterforce on the pedal lever 6 by means of the coupling element 10, where the counterforce acts counter to an actuating force exerted on the pedal lever 6. The actuating force is shown in each of the Figs. by an arrow 16. The force generation unit 14 and the coupling element 10 are designed and arranged in such a way that a progression of the counterforce along a pedal travel of the pedal lever 6 takes the form of a non-linear progression in a pedal travel-counterforce diagram (not shown).

In the present sample embodiment, the non-linear progression takes the form of a gradual progression. Correspondingly, the counterforce increases at a higher rate than the increase in pedal travel, i.e. with increasing actuation of the pedal lever 6 by a user. The user's actuating force 16 rotates the pedal lever 6 clockwise (in the image plane of FIG. 1 and FIG. 2) around the rotary axis 12 such that the pedal travel increases with actuation of the pedal lever 6 by the user, starting from the resting position of the pedal lever 6 shown in FIG. 1, until the actuating position of the pedal lever 6 shown in FIG. 2 is reached. In this context, the force generation unit 14 is designed in such a way that the progression of the counterforce in the pedal travel-counterforce diagram is constant, i.e. does not feature any force surges or the like.

In the mounting position of the pedal emulator 2 shown in FIG. 1 and FIG. 2, the force generation unit 14 is coupled in an articulated manner to the pedal lever 6 by means of the coupling element 10.

The force generation unit 14 and the coupling element 10 feature for generating the non-linear progression of the counterforce along the pedal travel a plurality of solely mechanical means that are explained in the following.

A first lever 18 and a second lever 20 are arranged in the housing 8, where the first lever 18 is connected in an articulated manner at a free end with the coupling rod 10. With a free end opposite this free end, the first lever 18 is arranged in articulated manner at the housing 8 by means of a rotary axis 22 of the housing 8. The housing 8 features an aperture 9 for the purpose of mechanically coupling the coupling rod 10 to the pedal lever 6. The second lever 20 is guided by a free end by means of a guide block 24 in a slotted guide 26 of the housing 8 designed as a linear guide. The slotted guide 26 serves specifically to guide the second lever 20. In addition, the slotted guide 26 prevents or reduces any unwanted buckling of the springs 28, 30. Furthermore, the second lever 20 is pretensioned against the first lever 18 by means of a first spring 28 and a second spring 30, each of which are mounted in an articulated manner at the housing 8 with one free end opposite the second lever 20. For this purpose, the first spring 28 is arranged at one end of the second lever 20 facing away from the slotted guide 26, whereas the second spring 30 is arranged at one end of the second lever 20 facing towards the slotted guide 26. In this context, the springs 28, 30 are only able to press directly against the second lever 20. It is, however, also conceivable that the springs 28, 30 are mounted in an articulated manner at the second lever 20. In the present sample embodiment, the springs 28, 30 each take the form of coil springs, where the spring 30 features a significantly higher spring constant than the spring 28. It is also conceivable that a plurality of springs 28, 30 are installed in the aforementioned manner instead of a single spring 28, 30 in each case. On the side of the second lever 20 opposite the two springs 28, 30, the latter features a guide 32 for the first lever 18 in the form of a free surface. In this context, the free surface 32 of the second lever 20 is designed in such a way that, in combination with the springs 28, 30 and the first lever 18, actuation of the pedal lever 6 by the user, i.e. movement of the pedal lever 6 along the pedal travel, results in a desired and previously defined ratio of counterforce to pedal travel along the pedal travel, i.e. a desired counterforce progression in the pedal travel-counterforce diagram.

As can be seen from FIG. 1 and FIG. 2, when passing along the pedal travel, the first lever 18 comes into contact with the free surface 32 of the second lever 20 only at points or in a linear manner, thus reducing for example the surface pressure between the first lever 18 and the second lever 20 to a great extent. Even if the contact between the first lever 18 and the second 20 is shown in FIG. 1 and FIG. 2 as points or a line, contact over a surface is always involved in real life, of course. Correspondingly, the aforementioned contact at points or in a line between the first lever 18 and the second 20 is a desirable ideal case in order to keep the surface pressure as low as possible. The contact at points between the first lever 18 and the second lever 20 on the image planes in FIG. 1 and FIG. 2 is marked in FIG. 1 and FIG. 2 by an arrow 34 in each case. Furthermore, it is apparent from FIG. 1 and FIG. 2 that the aforementioned contact at points 34 along the free surface 32 moves in the direction of the slotted guide 26 during increasing actuation of the pedal lever 6. In doing so, the torque exerted on the second lever 20 and the springs 28, 30 are increasingly compressed, where the spring 28 is more strongly compressed in comparison to the spring 30.

The inventive pedal emulator in accordance with the present sample embodiment makes an infinitely variable gradual force-travel curve, i.e. a counterforce progression in the counterforce-pedal travel diagram without surges in the counterforce progression, possible in a simple and compact design. The individual mechanical means of the inventive pedal emulator in accordance with the present sample embodiment further make it possible to adapt in a simple manner the force-travel curve to a large number of different requirements. Due to the design of the force generation unit 14 together with the coupling element 10 as a separate assembly essentially enclosed by the housing 8, the inventive pedal emulator can be given a modular design in accordance with the present sample embodiment. Furthermore, the inventive pedal emulator in accordance with the present sample embodiment can be flexibly adapted to various installation spaces of different vehicle types. For example, the inventive pedal emulator can be coupled simply, and thus cheaply, to various designs of pedal lever by means of the coupling element 10.

Further sample embodiments of the inventive pedal emulator are shown and explained as examples in the following. Components that are identical or have the same effect have been given the same reference numbers in the Figures. Furthermore, the following sample embodiments are each explained only to the extent to which they differ from the preceding sample embodiments. In all other respects, reference is made to the previous explanations and statements.

Figure 3:
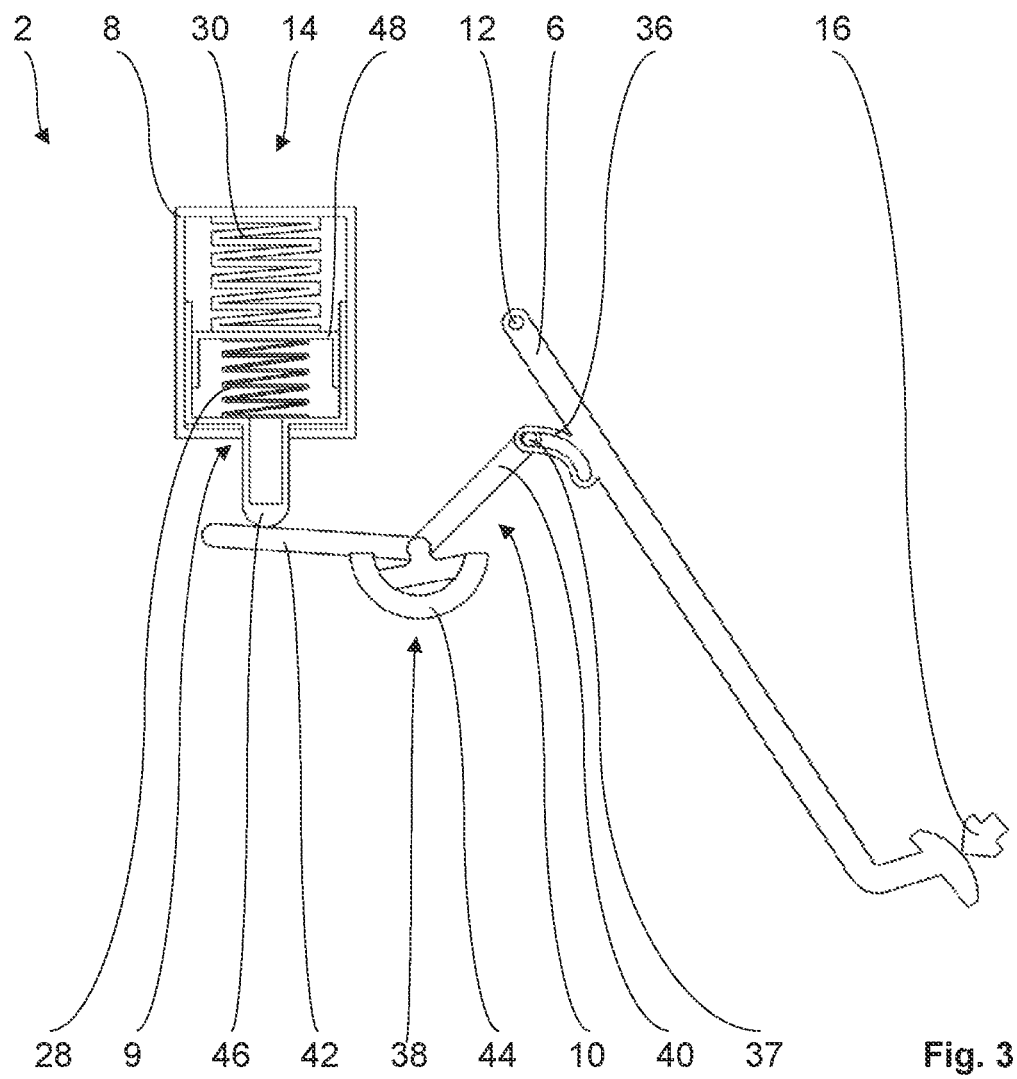
FIG. 3 is a second sample embodiment of the inventive pedal emulator in a crosssection side view with the pedal lever at a resting position.

FIG. 3 shows a second sample embodiment of the inventive pedal emulator. Differing from the first sample embodiment, the pedal lever 6 in the present sample embodiment features a slotted guide 36 into which a guide block 37 arranged at a coupling element 10, likewise designed as a coupling rod, engages to transmit force. Here, the coupling rod 10 features a central area 38 from which arms 40, 42 extend at an obtuse angle. The central area 38 of the coupling rod 10 forms a slide bearing together with the slide bearing socket 44. The slide bearing socket 44 is, for example, a component of the base part. In line with the first sample embodiment, the present sample embodiment also features a housing 8 in which the force generation unit 14 is arranged. The housing 8 again features an aperture 9 through which, in the present sample embodiment, a tappet 46 extends for the purpose of creating a force transmission connection with the arm 42 of the coupling rod 10. The tappet 46 is pretensioned by a first spring 28 and a second spring 30 against the arm 42 and thus against the coupling rod 10, where the first spring 28 and the second spring 30 are arranged in series. Springs 28, 30 likewise take the form of coil springs and are separated from each other by a piston 48. The spring constant of the spring 30 is significantly higher than the spring constant of the spring 28. The second spring 30 is supported directly at the housing 8, whereas the first spring 28 is directly supported at the piston 48.

When the pedal lever 6 is actuated by the user, i.e., when an actuating force 16 is exerted on the pedal lever 6, the pedal lever 6 rotates clockwise around a rotary axis 12, such that the arm 40 of the coupling rod 10 is moved downwards in the image plane of FIG. 3 around the central area 38 by means of the slotted guide 36 and the guide block 37. Correspondingly, the arm 42 of the coupling rod 10 moves upwards around the central area 38 in the image plane of FIG. 1 in the direction of the tappet 46 with increasing actuation of the pedal lever 6 and thus with increasing pedal travel of the pedal lever 6. The tappet 46 is initially pressed into the housing 8 against the spring force of the first spring 28. As soon as the tappet 46 comes into contact with the piston 48, the tappet 46 must be moved on against the spring force of the first spring 28 and at the same time the spring force of the second spring 30. As already explained above, the spring 28 and the spring 30 are arranged in series in the present sample embodiment. This means that the same load acts on both springs 28, 30. The two springs 28, 30 move to different extents, nevertheless, due to the different spring constants. As soon as the tappet 46 comes into contact with the piston 48, the spring 28 can no longer move and the spring 30 acts alone. The counterforce exerted on the pedal lever 6 by the force generation unit 14 by means of the tappet 46 and the coupling rod 10 increases correspondingly. When the pedal lever 6 moves along the pedal travel, the tappet 46 moves relative to the arm 42 of the coupling rod 10, where the tappet 46 slides along on the arm 42 of the coupling rod 10.

In line with the first sample embodiment, it is possible to generate in a targeted manner a desired progression of the counterforce in a pedal travel-counterforce diagram (not shown) by means of a correspondingly coordinated design and arrangement of the aforementioned mechanical means of the force generation unit 14 and the coupling element 10. In the present sample embodiment, the slotted guide 36 of the pedal lever 6 also contributes to the setting of the desired pedal travel-counterforce progression. Furthermore, the present sample embodiment makes it possible to generate friction in a targeted manner so that a desired hysteresis can be implemented in a simple manner between an actuation of the pedal lever 6 and an automatic return movement of the pedal lever 6 into its resting position shown in FIG. 3. It is possible, for example, to design the slide bearing with the central area 38 of the coupling rod 10 and the slide bearing socket 44 in a manner suitable to achieve a desired hysteresis. Conceivable parameters for this would be, for example, the bearing diameter and its friction radius and the combination of materials and thus the p value. After the tappet 46 comes into contact with the piston 48, only the second spring 30 continues to be compressed as the first spring 28 is prevented from being further compressed by the piston 48. The second sample embodiment is a very compact implementation of the inventive pedal emulator.

Figure 4:
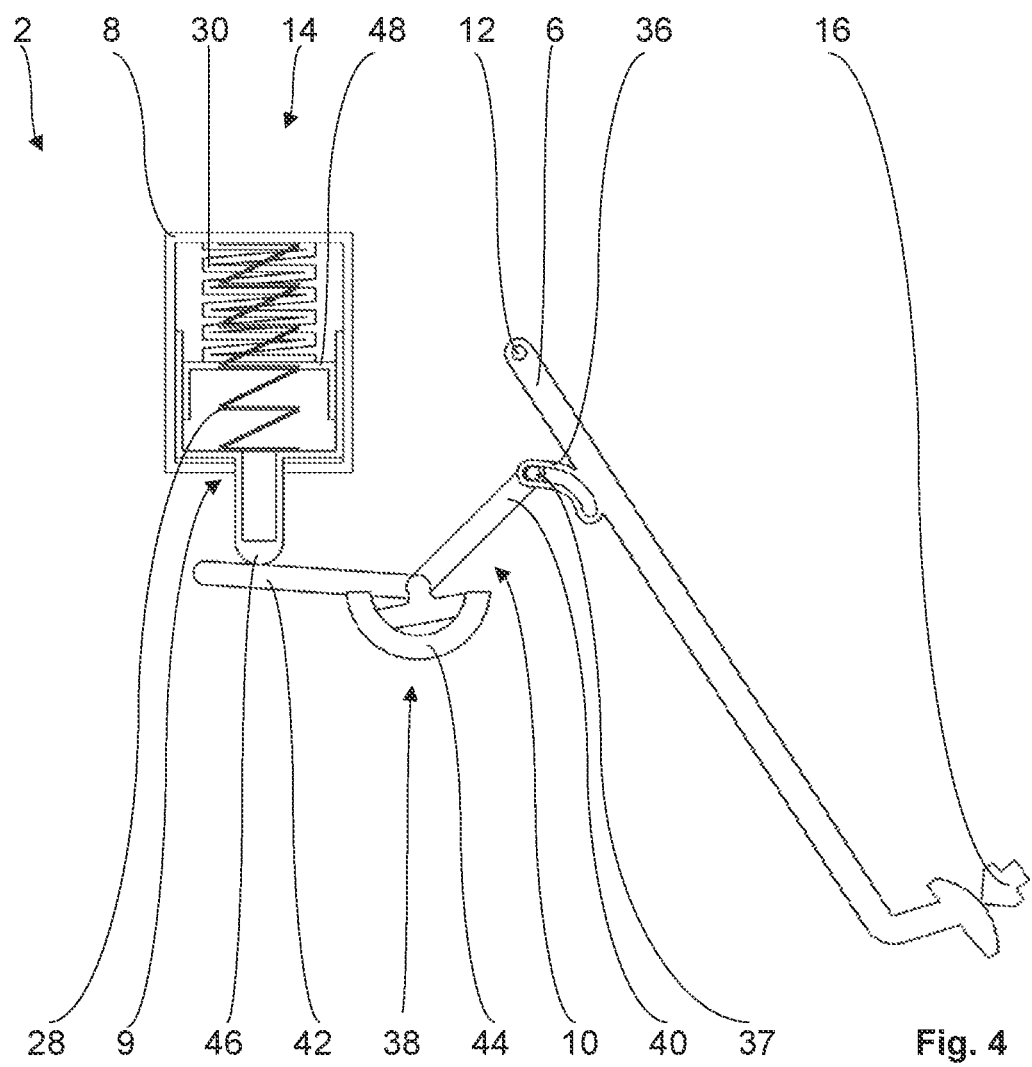
FIG. 4 is a third sample embodiment of the inventive pedal emulator in a crosssection side view with the pedal lever at a resting position.

FIG. 4 shows a third sample embodiment of the inventive pedal emulator, where the third sample embodiment corresponds to a large extent to the second sample embodiment. Differing from the sample embodiment, the first spring 28 and the second spring 30 in the third sample embodiment are not arranged in series but in parallel to each other. This embodiment has the advantage over the second sample embodiment that, in the event of a failure of one of the two springs 28, 30 the remaining functioning spring 30, 28 maintains the availability of the inventive pedal emulator in accordance with this embodiment. In line with the second sample embodiment, with the present sample embodiment only the first spring 28 is compressed until the tappet 46 comes into contact with the piston 48.

Figure 5:
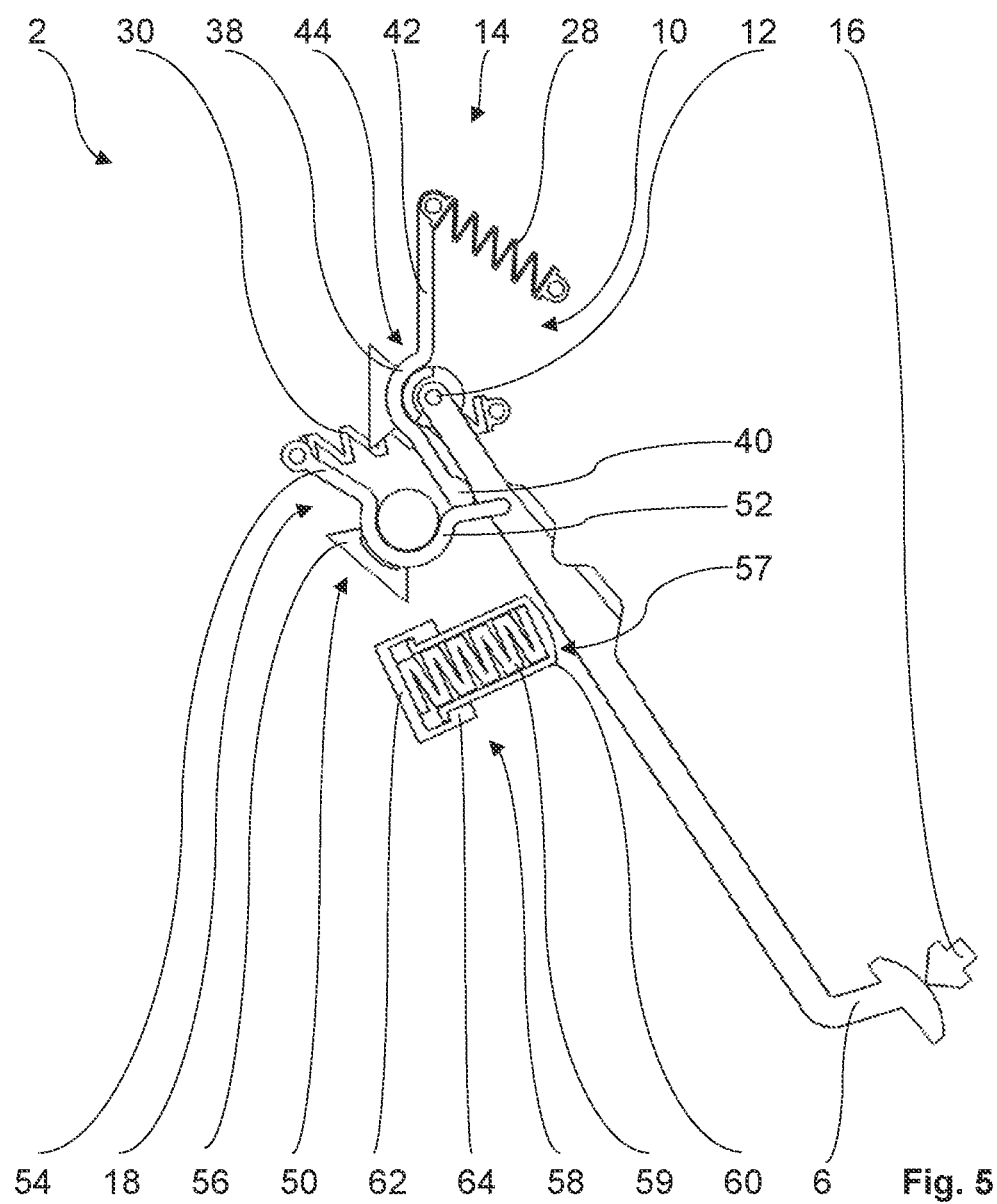
FIG. 5 is a fourth sample embodiment of the inventive pedal emulator in a crosssection side view with the pedal lever at a resting position.

FIG. 5 shows a fourth sample embodiment of the inventive pedal emulator. In the present pedal emulator 2, the pedal emulator 2 features several coupling elements for mechanical coupling of a force generation unit 14 with a pedal lever 6 pivotable around a rotary axis 12. One coupling element 10 is, in line with the second and third sample embodiment, designed as a coupling rod 10 with a central area 38 and two arms 40, 42 extending away from the central area 38, that in turn form an obtuse angle. The central area 38 of the coupling rod 10 forms a slide bearing together with the slide bearing socket 44. The slide bearing socket 44 is, for example, a component of the base part. As can be seen from FIG. 5, the spatial orientation of a virtual rotary axis of the coupling rod 10 is essentially identical to the rotary axis 12 of the pedal lever 6, where the arm 40 is in a force transmission connection with pedal lever 6, whereas the arm 42 acts with its free end in conjunction with a free end of a first spring 28 to transmit force. The first spring 28, for example, is fixed to the base part (not shown) by the free end of the first spring 28 opposite this free end of the first spring 28. In line with the coupling rod 10, a first lever 18 features a central area 50 and two arms 52, 54 extending away from the central area 50, that form an obtuse angle. Together with a slide bearing socket 56, the central area 50 of the first lever 18 forms a slide bearing. The slide bearing socket 56 is, for example, a component of the base part.

As can be seen from FIG. 5, the spatial alignment of a virtual rotary axis of the first lever 18 is essentially parallel to the rotary axis 12 of the pedal lever 6, where the arm 52 is in a force transmission connection with the coupling rod 10 after completing a previously defined pedal travel of the pedal lever 6, starting at the resting position of the pedal lever 6. Up to this previously defined pivoting position of the pedal lever 6 after completing the first pedal travel of the pedal lever 6, i.e. during the first section of movement of the pedal lever 2, the first lever 18 and the coupling rod 10 are not linked in a force transmission connection. For this purpose, the pedal emulator 2 in accordance with the present sample embodiment features a stop (not shown) for the first lever 18. The arm 54 of the first lever 18, is connected by its free end to a free end of a second spring 30 to transmit force. The second spring 30, for example, is fixed to the base part (not shown) at the free end of the second spring 30 opposite this free end of the second spring 30. In addition, a further coupling element 57 features at the same time a part of the force generation unit 14, specifically a third spring 59. The third spring 59 is supported with a free end in a bearing 58, where the bearing 58 is likewise fixed to the base part. The bearing 58 features a sleeve 60 and a mounting part 62, where the mounting part 62 and the sleeve 60 feature means designed to correspond to each other that together form a stop 64 for the third spring 59. With a free end of the further coupling element 57 opposite the bearing 58, the further coupling element 57 with the third spring 59 is linked by a force transmission connection to the pedal lever 6 after completing a previously defined second pedal travel of the pedal lever 6 starting at the resting position of the pedal lever 6, where the second pedal travel is larger than the first pedal travel. Up to this previously defined pivoting position of the pedal lever 6 after completing the second pedal travel of the pedal lever 6, i.e. during the second section of movement of the pedal lever 6, the further coupling element 57 with the third spring 59 and the pedal lever 6 are not linked by a force transmission connection.

When the pedal lever 6 is actuated by the user, i.e., when an actuating force 16 is exerted on the pedal lever 6, the pedal lever 6 rotates clockwise around the rotary axis 12, such that the arm 40 of the coupling rod 10 is moved to the left in the image plane of FIG. 5 by means of the pedal lever 6 rotating around the central area 38. Correspondingly, the arm 42 of the coupling rod 10 moves to the right in the direction of the first spring 28 with increasing actuation of the pedal lever 6 and thus with increasing pedal travel of the pedal lever 6 rotating around the central area 38 in the image plane of FIG. 5, such that the first spring 28 is increasingly compressed with increasing pedal travel. After the pedal lever 6 has completed the first section of movement of the pedal lever 6, starting from its resting position, and has reached the corresponding pivoting position, the coupling rod 10 with the arm 40 becomes linked by a force transmission connection with the arm 52 of the first lever 18. As the pedal travel of pedal lever 6 further increases, i.e. during a second section of movement of the pedal lever 6, the coupling rod 10 presses the arm 52 of the first lever 18 in the image plane of FIG. 5 downward, rotating around the central area 50 of the first lever 18, such that the arm 54 of the first lever 18 is pressed upwards. The second spring 30 is correspondingly compressed. If the pedal lever 6 is pressed further downward, i.e. with further increasing pedal travel, the pedal lever 6 becomes linked by a force transmission connection with the further coupling element 57 with the third spring 59. In this respect, the corresponding pivoting position of the pedal lever 6 corresponds to the second pedal travel of pedal lever 6 completed by that point. With a further increase in actuation of the pedal lever 6 and thus with a further increase in the pedal travel, the third spring 59 is likewise compressed.

In the present fourth sample embodiment, a counterforce in three steps can be generated by the force generation unit 14 by means of the springs 28, 30, 59, where initially only the coupling rod 10 with the first spring 28 is linked by a force transmission connection with the pedal lever 6. After completing the first pedal travel, the second spring 30 additionally becomes linked by a force transmission connection with pedal lever 6 by means of the first lever 18 and the coupling rod 10. Finally, the third spring 59 becomes linked by a force transmission connection with pedal lever 6 after completing the second pedal travel.

Figure 6:
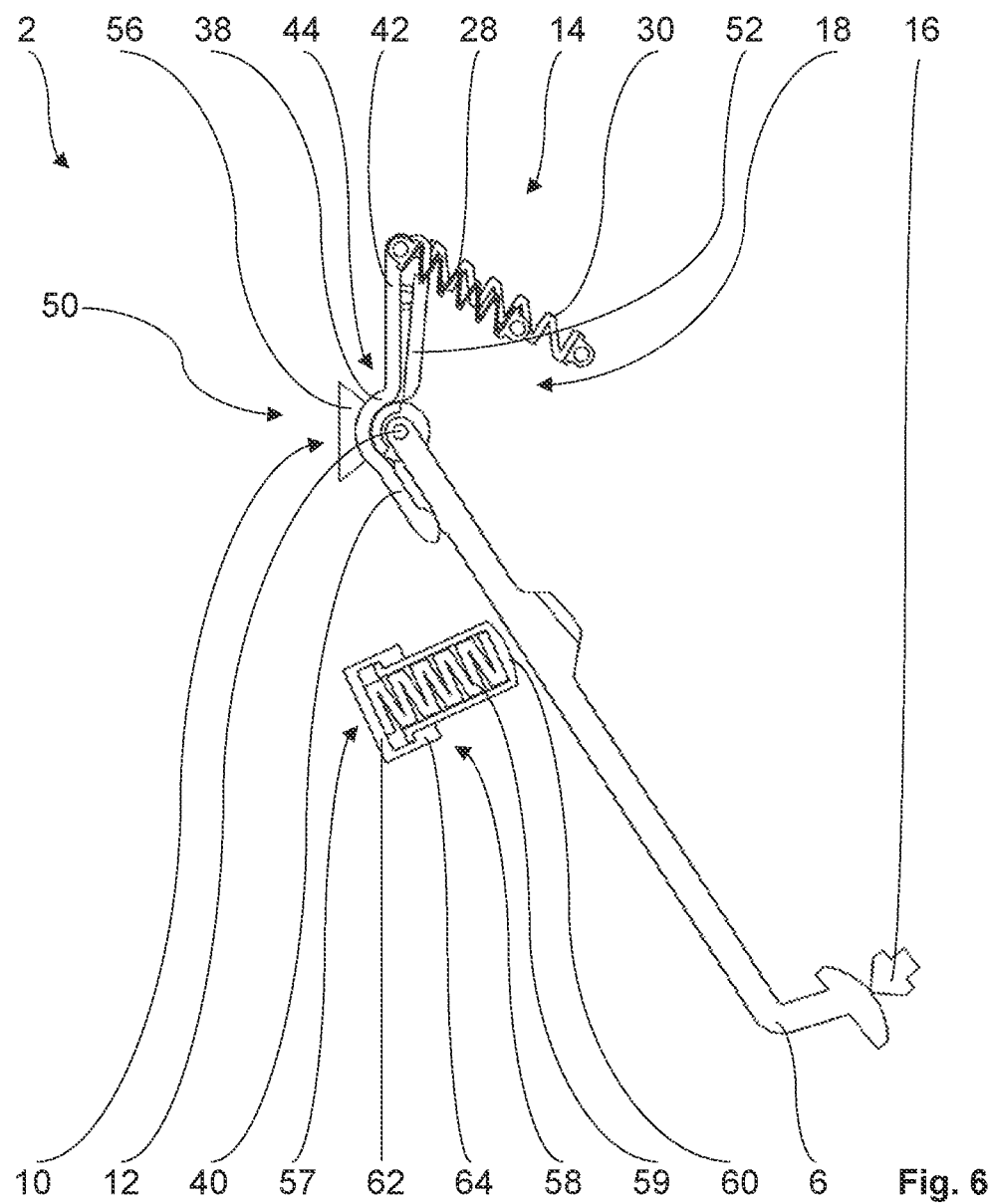
FIG. 6 is a fifth sample embodiment of the inventive pedal emulator in a crosssection side view with the pedal lever at a resting position.

The fifth sample embodiment of the inventive pedal emulator shown in FIG. 6 is essentially identical to the fourth sample embodiment such that reference can be made to a large extent to the above statements on the fourth sample embodiment on the basis of FIG. 5. Differing from the fourth sample embodiment, in the fifth sample embodiment both the virtual rotary axis of the coupling rod 10 and the virtual rotary axis of the first lever 18 essentially coincide with the rotary axis 12 of pedal lever 6. The spatial alignment of both the virtual rotary axis of the coupling rod 10 and the spatial alignment of the virtual rotary axis of the first lever 18 are thus essentially identical to the spatial alignment of the rotary axis 12. For this, see FIG. 6. With regard to the bearing of coupling rod 10 and the first lever 18, it is firstly possible to use only a shared slide bearing socket. Secondly, it is conceivable that the coupling rod 10 and the first 18 each feature a corresponding slide bearing socket 44, 56 in line with the fourth sample embodiment. Differing from the fourth sample embodiment in accordance with FIG. 5, the coupling of the coupling rod 10 with the first lever 18 is not effected by means of the arms 40 and 52 but by means of arms 42 and 52.

With the fourth and the fifth sample embodiment, different force generation elements of the force generation unit 14 become linked by a force transmission connection, one after the other, with pedal lever 6, whereby a desired gradual rise in the counterforce can be achieved as the pedal travel increases, i.e. a progression in the counterforce in a pedal travel-counterforce diagram (not shown). Furthermore, the first spring 28 and the second spring 30 are arranged in such a way that their respective force's angle of attack, i.e. their respective force direction relative to the corresponding mechanical means, specifically the coupling rod 10 on the one side and the first lever 18 on the other, changes as the pedal travel increases. This makes it possible to achieve a homogeneous increase in the spring force. In addition, it is possible to generate friction in a targeted manner by means of the force transmission connection between the coupling rod 10 and the first lever 18 as well as between the coupling rod 10 and the pedal lever 6, such that it is possible to implement a desired hysteresis in the movement of the pedal lever 6.

Figure 7:
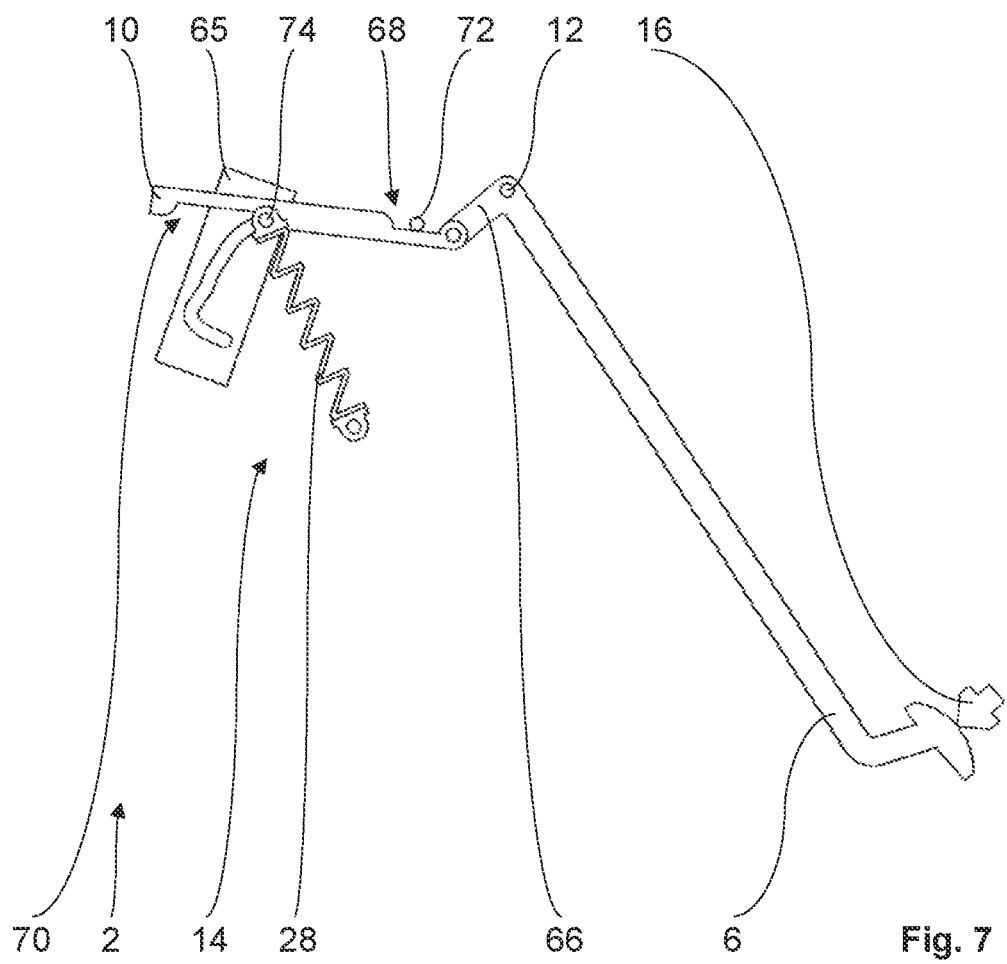
FIG. 7 is a sixth sample embodiment of the inventive pedal emulator in a side view with the pedal lever at a resting position.

FIG. 7 shows a sixth sample embodiment of the inventive pedal emulator. The pedal emulator 2 of this sample embodiment features a guide in the form of a slotted guide 65, but the slotted guide 65 in the present sample embodiment is not arranged at a pedal lever 6 but away from it. The pedal lever 6 is, in turn, arranged in a pivotable manner on a rotary axis 12 fastened to a base part (not shown). A further arm 66 is formed on the pedal lever 6 that extends away starting at the rotary axis 12 and encloses an acute angle with the other pedal lever 6. At one free end of the arm 66, the arm 66 is connected in an articulated manner with a coupling element 10 taking the form of a coupling rod. The coupling rod 10 features a first longitudinal guide 68 and a second longitudinal guide 70. The first longitudinal guide 68 engages with a bolt 72 fastened to the base part (not shown) of the pedal emulator 2. In the present sample embodiment, the base part is fastened, in line with the previous sample embodiments, to a structure of a vehicle (not shown) equipped with the pedal emulator 2. The second longitudinal guide 70 engages with a guide block 74 of a first spring 28 of a force generation unit 14, where the guide block 74 of the first spring 28 is arranged at a free end of the first spring 28 and is guided in the said slotted guide 65. The first spring 28 bears in an articulated manner on a bearing of the base part with a free end opposite the guide block 74.

If a vehicle user (not shown) actuates the pedal lever 6, i.e. the user presses the pedal lever 6 by means of an actuating force 16 to the bottom left in the image plane of FIG. 7, the pedal lever 6 rotates clockwise around the rotary axis 12 in the image plane of FIG. 7. In doing so, the arm 66 correspondingly likewise rotates clockwise upwards around the rotary axis 12 in the image plane of FIG. 7. On account of the articulated connection between the arm 66 and the coupling rod 10, the latter moves in such a way that the bolt 72 shifts to the left in the image plane of FIG. 7 in the first longitudinal guide 68 of the coupling rod 10. At the same time, the coupling rod 10 rotates around the bolt 72 by means of the first longitudinal guide 68, such that the second longitudinal guide 70 of the coupling rod 10 moves downward in the image plane of FIG. 7. In doing so, the coupling rod 10 presses the guide block 74 downwards in the image plane of FIG. 7, such that the guide block 74 moves downwards in the slotted guide 65. Given the forced guidance of the guide block 74 in the slotted guide 65, the first spring 28 is firstly compressed more or less strongly depending on the slotted guide 65 and secondly the point of applied force and the force direction, i.e. the force's angle of attack, of the first spring 28 changes in relation to the coupling rod 10.

Using the slotted guide 65, it is possible to set at will, within wide suitable limits, a desired pedal feeling, i.e. a desired haptic impression when actuating the pedal lever 6 by means of an actuating force 16. Correspondingly, the counterforce exerted on the pedal lever 6 by means of the force generation unit 14 for generating the desired pedal feeling can be created in particular by the design of the slotted guide 65. For example, a homogeneous progression of the counterforce in a pedal travel-counterforce diagram (not shown), i.e. a progression without fluctuations in the counterforce can be achieved. As is the case with the aforementioned sample embodiments, the entire arrangement of the pedal emulator 2 in the present sample embodiment, particularly the force generation unit 14 with the first spring 28 and the slotted guide 65 as well as the coupling element 10 in the form of a coupling rod is ultimately decisive for the inventive generation of the non-linear progression of the counterforce, for example a gradual progression of the counterforce with increasing pedal travel of the pedal lever 6. On account of the mechanical means of the force generation unit 14 and the coupling element 10 used, the progression of the counterforce can be chosen at will in wide suitable limits in the pedal travel-counterforce diagram.

Figure 8:
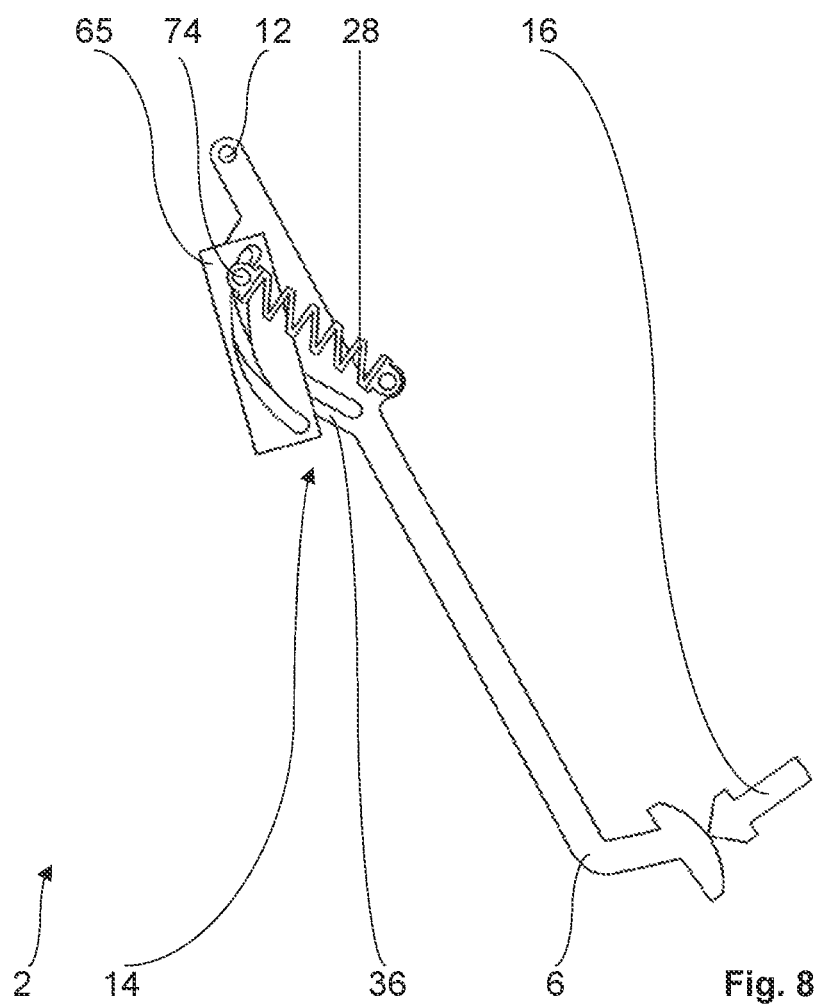
FIG. 8 is a seventh sample embodiment of the inventive pedal emulator in a side view with the pedal lever at a resting position.

FIG. 8 shows a seventh sample embodiment of the inventive pedal emulator. The seventh sample embodiment is essentially identical to the sixth sample embodiment such that reference can be made to a large extent to the above statements on the sixth sample embodiment on the basis of FIG. 7. Differing from the sixth sample embodiment, in the present sample embodiment there is no coupling element in the form of a coupling rod. Instead, a pedal lever 6 features, in line with the second and the third sample embodiment, a slotted guide 36. The pedal lever 6 is, in turn, bears in a pivotable manner on a rotary axis 12 around rotary axis 12. In addition, a first spring 28 of a force generation unit 14 bears on a bearing in an articulated manner at the pedal lever 6, where the first spring 28 features a guide block 74 at a free end opposite the bearing point; this guide block is force guided, firstly in the slotted guide 36 of the pedal lever 6 and secondly in a slotted guide 65 separate from the pedal lever 6. If a vehicle user (not shown) actuates the pedal lever 6, i.e. the user presses the pedal lever 6 by means of an actuating force 16 to the bottom left in the image plane of FIG. 8, the pedal lever 6 rotates clockwise around the rotary axis 12 in the image plane of FIG. 8. Correspondingly, the guide block 74 moves both in the slotted guide 36 and in the guide block 65 downwards in the image plane of FIG. 8. Given the forced guidance of the guide block 74 in the slotted guides 36 and 65, the first spring 28 is firstly compressed more or less strongly depending on the two slotted guides 36 and 65 and secondly the point of applied force and the force direction of the first spring 28 changes in relation to the slotted guide 65 and the pedal lever 6.

Using the combination of the two slotted guides 36 and 65, it is likewise possible to set at will, within wide suitable limits, a desired pedal feeling, i.e. a desired haptic impression when actuating the pedal lever 6 by means of an actuating force 16. Correspondingly, the counterforce exerted on the pedal lever 6 by means of the force generation unit 14 for generating the desired pedal feeling can be created in particular by the design of the two slotted guides 36 and 65 acting in combination. For example, a homogeneous progression of the counterforce in a pedal travel-counterforce diagram (not shown), i.e. a progression without fluctuations in the counterforce can be achieved.

The sixth and seventh sample embodiment of the inventive pedal emulator feature only very few mechanical means such that the inventive pedal emulator in accordance with this sample embodiment can be implemented using an especially simple design. At the same time, the installation space required for the inventive pedal emulator is greatly reduced while maintaining the existing functioning of the inventive pedal emulator regarding implementation of a desired pedal feeling when actuating the pedal emulator 6 with an actuating force 16 with smooth transitions in the progress of the counterforce with increasing pedal travel.

Figure 9:
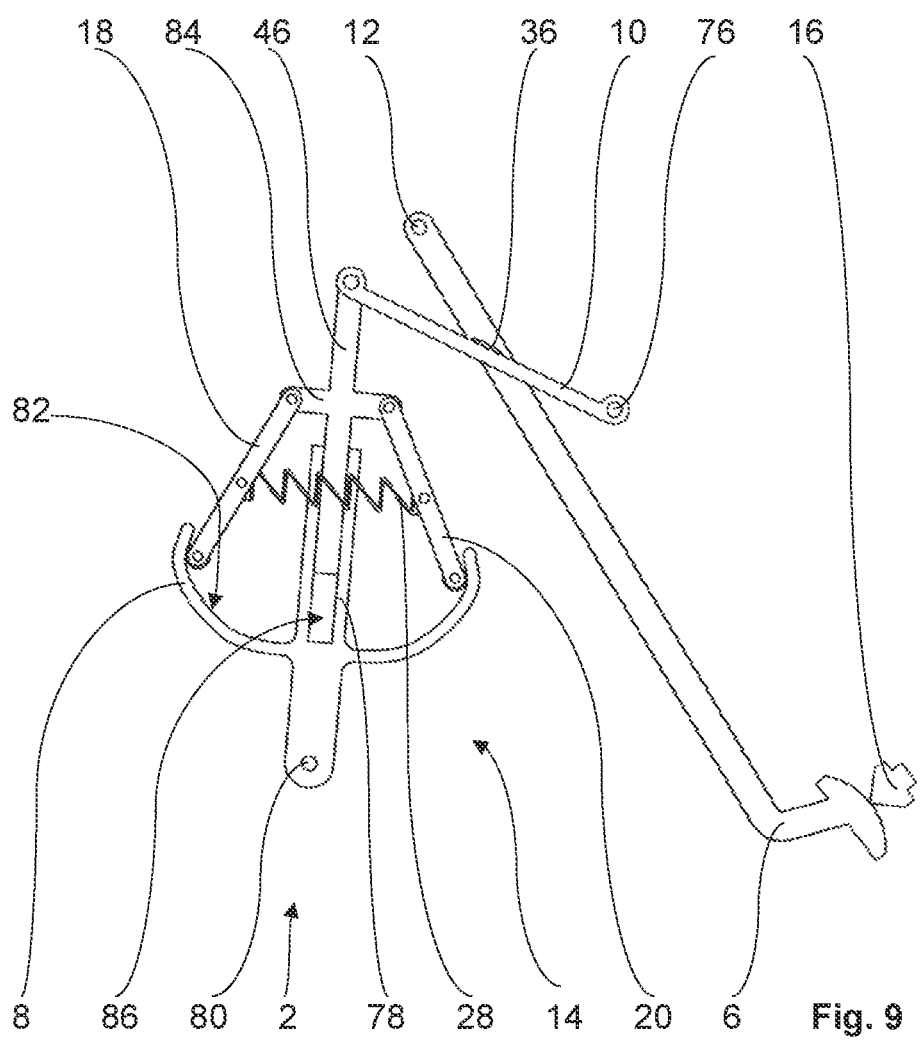
FIG. 9 is an eighth sample embodiment of the inventive pedal emulator in a crosssection side view with the pedal lever at a resting position.

FIG. 9 shows an eighth sample embodiment of the inventive pedal emulator for a vehicle (not shown). The pedal emulator 2 features a pedal lever 6 that is mounted on a rotary axis 12 so that it is pivotable around said rotary axis 12, where the rotary axis 12 is fastened to a base part (not shown) of the pedal emulator 2. Differing from the second, the third and the seventh sample embodiment, the pedal lever 6 features a guide 36 in the form of a free surface that serves to guide a coupling element 10 in the form of a coupling rod. The coupling rod 10 is further is mounted on a rotary axis 76 at a free end so that it pivotable around the rotary axis 76, where the rotary axis 76 is, for example, fastened to the base part of the pedal emulator 2. The coupling rod 10 is connected in an articulated manner at a free end opposite the rotary axis 76 with a tappet 46 of a force generation unit 14. The tappet 46 is guided in a slotted guide 78 of a housing 8 designed as an longitudinal guide, where the housing 8 is mounted to the base part in an articulated manner by means of a bearing point 80. The housing 8 further features a guide 82 in the form of a free surface. A first lever 18 and a second lever 20 are arranged in an articulated manner at a crossbar 84 running crosswise to the main extension direction of the tappet 46 each at a free end of the crossbar 84, where the two levers 18, 20 are each guided by the free ends opposite the crossbar 84 at the free surface 82 of the housing 8. The two levers 18, 20 are furthermore connected with a first spring 28 to transmit force, where the first spring 28 is connected to transmit force roughly at the center in each case by a free end of the first spring 28 in each case with the first lever 18 and the second lever 20.

The arrangement of the first lever and the second lever 18, 20 with the first spring 28 and the guide of the first and the second lever 18, 20 at the free surface 82 of the housing 8 serves, among other things, to equalize out undesired lateral forces, i.e. forces that essentially act crosswise to the main force direction of the tappet 46, specifically crosswise to the main extension direction of the tappet 46. These lateral forces are disruptive forces that should be avoided as much as possible. Given the aforementioned arrangement, lateral forces in the present sample embodiment are essentially prevented, at least effectively prevented. In the present sample embodiment with the aforementioned arrangement, the force generation unit 14 thus also features a device for reducing or avoiding lateral forces acting crosswise to the main force direction of the force generation unit 14. For this purpose, the device for reducing or avoiding lateral force features the first spring 28 that acts crosswise to the main force direction of the force generation unit 14, specifically crosswise to the tappet 46 and thus parallel to the crossbar 84. In this context, the first and the second lever 18, 20 engage the free surface 82 with their free ends facing towards the free surface 82 of the housing 8. For this purpose, the first and the second lever 18, 20 are each able to slide or roll with their free ends on the free surface 82.

If the pedal lever 6 is moved by a user (not show) from the resting position shown in FIG. 9 to the bottom left in the image plane of FIG. 9 by means of an actuating force 16, i.e. with increasing pedal travel of the pedal lever 6, the coupling rod 10 is rotated counterclockwise in the image plane of FIG. 9 around the rotary axis 76 by means of the guide 36. In doing so, the tappet 46 is moved downwards in the image plane of FIG. 9 on account of the articulated connection between the coupling rod 10 and the tappet 46. The tappet 46 slides in the longitudinal guide 78 in the direction of the free surface 82, where the first and second levers 18, 20 bearing on the crossbar 84 are each likewise pressed downwards in the direction of the free surface 82 of the housing 8. In doing so, the first lever and the second lever 18, 20 are moved towards each other on account of the contour of the free surface 82, where the first spring 28 is increasing compressed. This now causes a counterforce to set in that acts against the actuating force 16. In this way, it is possible, for example, to implement a gradual progression of the counterforce generated by means of the force generation unit 14 with increasing pedal travel of the pedal lever 6, i.e. a gradual progression of the counterforce in a pedal travel-counterforce diagram (not shown) for the pedal emulator 2 in the present sample embodiment.

In an alternative embodiment, it is possible, for example, for an additional elastic element, for example a second spring, to be arranged in the longitudinal guide 78 between the housing 8 and the tappet 46 guided in the longitudinal guide 78, i.e. in the clearance marked by an arrow 86. Correspondingly, it is possible to use this additional elastic element to introduce additional force, for example an additional linear force, by means of the tappet 46. In line with the sample embodiments already explained above, it would be conceivable to introduce additional force over the entire pedal travel or only over part of the pedal travel of the pedal lever.

The embodiment of the inventive pedal emulator in accordance with the eighth sample embodiment makes it possible, for example, to achieve a gradual progression of the counterforce with large spread with increasing pedal travel of the pedal lever 6 in the pedal travel-counterforce diagram that is free from force surges over the progression of the counterforce.

Figure 10:
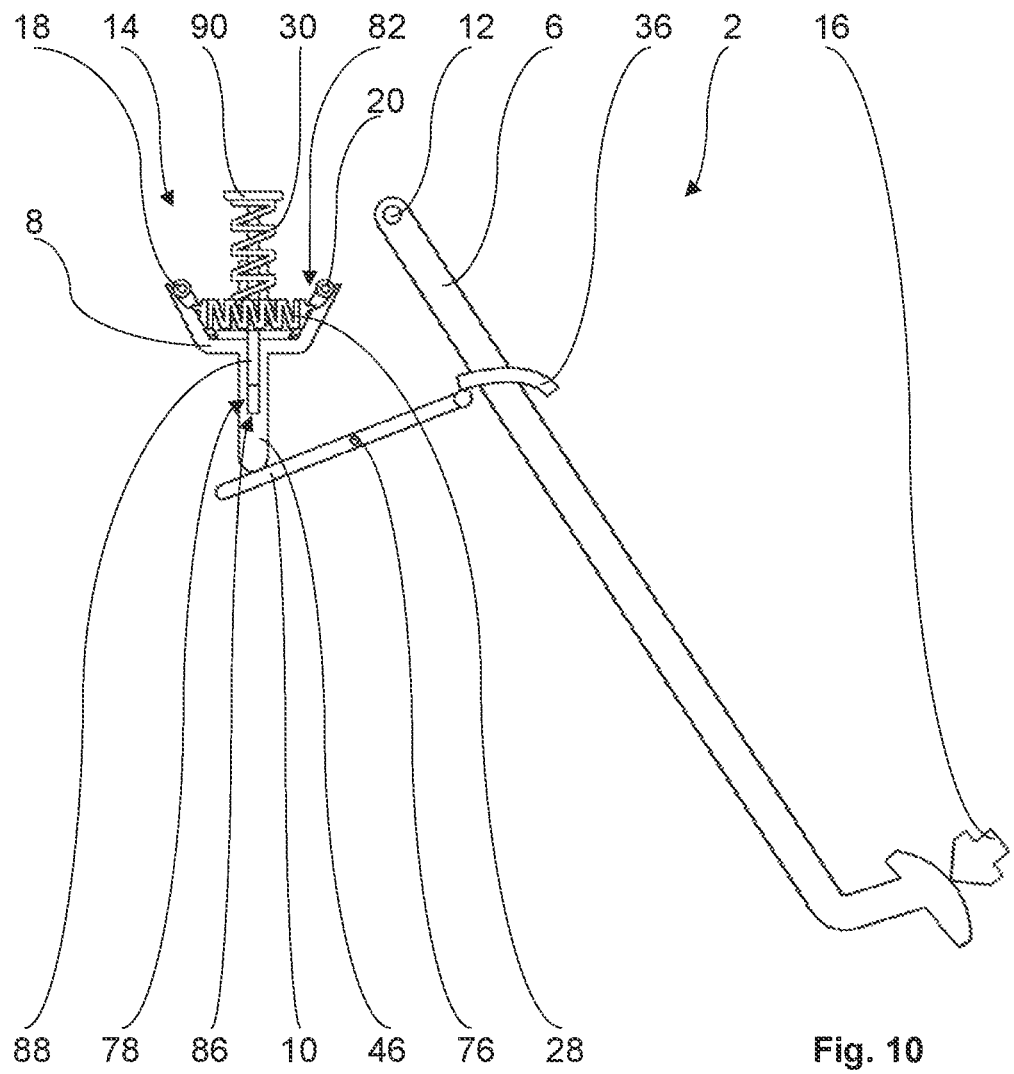
FIG. 10 is a ninth sample embodiment of the inventive pedal emulator in a crosssection side view with the pedal lever at a resting position.

A ninth sample embodiment of the inventive pedal emulator is shown in FIG. 10. This embodiment is similar to the eighth sample embodiment but features the following differences: The pedal emulator 2 features a pedal lever 6 that is mounted on a rotary axis 12 so that it is pivotable around said rotary axis 12, where the rotary axis 12 is, for example, fastened in turn to a base part (not shown) of the pedal emulator 2. In line with the eighth sample embodiment, the pedal lever 6 features a guide 36 in the form of a free surface that serves to guide a coupling element 10 in the form of a coupling rod. Differing from the eighth sample embodiment, the coupling rod 10 is further mounted on a rotary axis 76 roughly at the middle of the coupling rod 10 so that it pivotable around the rotary axis 76, where the rotary axis 76 is, for example, fastened to the base part. With a free end facing towards the pedal lever 6, the coupling rod 10 engages the guide 36 of the pedal lever 6. With a free end of the coupling rod 10 facing away from the pedal lever 6, the coupling rod 10 is linked by a force transmission connection to a tappet 46 of a force generation unit 14. A guide 82 in the form of a free surface is formed at the tappet 46 featuring a housing 8, in line with the housing of the eighth sample embodiment. Furthermore, the tappet 46 features a slotted guide 78 in the form of a longitudinal guide for a first bolt 88, where the first bolt 88 is pretensioned against a second bolt 90 by means of a second spring 30. A first lever 18 and a second lever 20 are arranged in an articulated manner at the first bolt 88, in line with the eighth sample embodiment, where both levers 18, 20 are each linked in a force transmission connection at a free end of the respective lever 18, 20 facing towards the free surface 82 of the tappet 46 with the free surface 82 and thus with the tappet 46. For this purpose, the free end of the respective lever 18, 20 facing towards the free surface 82 slides or rolls on the free surface 82.

In line with the eighth sample embodiment, a first spring 28 is arranged between the first lever 18 and the second lever 20, which is linked in force transmission connection with the first lever 18 and the second lever 20. The arrangement of the first lever and the second lever 18, 20 with the first spring 28 and the guide of the first and the second lever 18, 20 at the free surface 82 of the tappet 46 serves, in line with the eighth sample embodiment, to equalize out undesired lateral forces, i.e. forces that essentially act crosswise to the main force direction of the tappet 46. Given the aforementioned arrangement, lateral forces in the present sample embodiment are essentially prevented, at least effectively prevented. In the present sample embodiment with the aforementioned arrangement, the force generation unit 14 thus likewise features a device for reducing or avoiding lateral forces acting crosswise to the main force direction of the force generation unit 14. For this purpose, the device for reducing or avoiding lateral force features the first spring 28 that acts crosswise to the main force direction of the force generation unit 14, specifically crosswise to the tappet 46. In this context, the first and the second lever 18, 20 engage the free surface 82 with their free ends facing towards the free surface 82 of the tappet 46.

If the pedal lever 6 is moved by a user (not show) from the resting position shown in FIG. 10 to the bottom left in the image plane of FIG. 10 by means of an actuating force 16, i.e. with increasing pedal travel of the pedal lever 6, the coupling rod 10 is rotated clockwise in the image plane of FIG. 10 around the rotary axis 76 by means of the guide 36. In doing so, the tappet 46 is moved upwards in the image plane of FIG. 10 on account of the force transmission connection between the coupling rod 10 and the tappet 46. Correspondingly, the first bolt 88 is moved by the tappet 46 upwards in the direction of the second bolt 90 in the image plane of FIG. 10, such that the second spring 30 is increasingly compressed with increasing pedal travel of the pedal lever 6. Furthermore, the first lever and the second lever 18, 20 are moved towards each other on account of the contour of the free surface 82 of the tappet 46, where the first spring 28 is increasing compressed. This now causes a counterforce to set in that acts against the actuating force 16.

In this way, it is possible, for example, to implement a gradual progression of the counterforce generated by means of the force generation unit 14 with increasing pedal travel of the pedal lever 6, i.e. a gradual progression of the counterforce in a pedal travel-counterforce diagram (not shown) for the pedal emulator 2 in the present sample embodiment. In line with the eighth sample embodiment, it is possible in an alternative embodiment, for example, for an additional elastic element, for example a third spring, to be arranged in the longitudinal guide 78 between the tappet 46 and the bolt 88 guided in the longitudinal guide 78, i.e. in the clearance marked by an arrow 86. Correspondingly, it is possible to use this additional elastic element to introduce additional force, for example a linear force, by means of the tappet 46. In line with the sample embodiments already explained above, it would be conceivable to introduce additional force over the entire pedal travel or only over part of the pedal travel of the pedal lever.

In comparison to the eighth sample embodiment, the embodiment in accordance with the ninth sample embodiment makes it possible to achieve a greater degree of gradualness in the progression of the counterforce, i.e. a much more gradual progression of the counterforce in the pedal travel-counterforce diagram of the inventive pedal emulator in accordance with the present sample embodiment.

Figure 11:
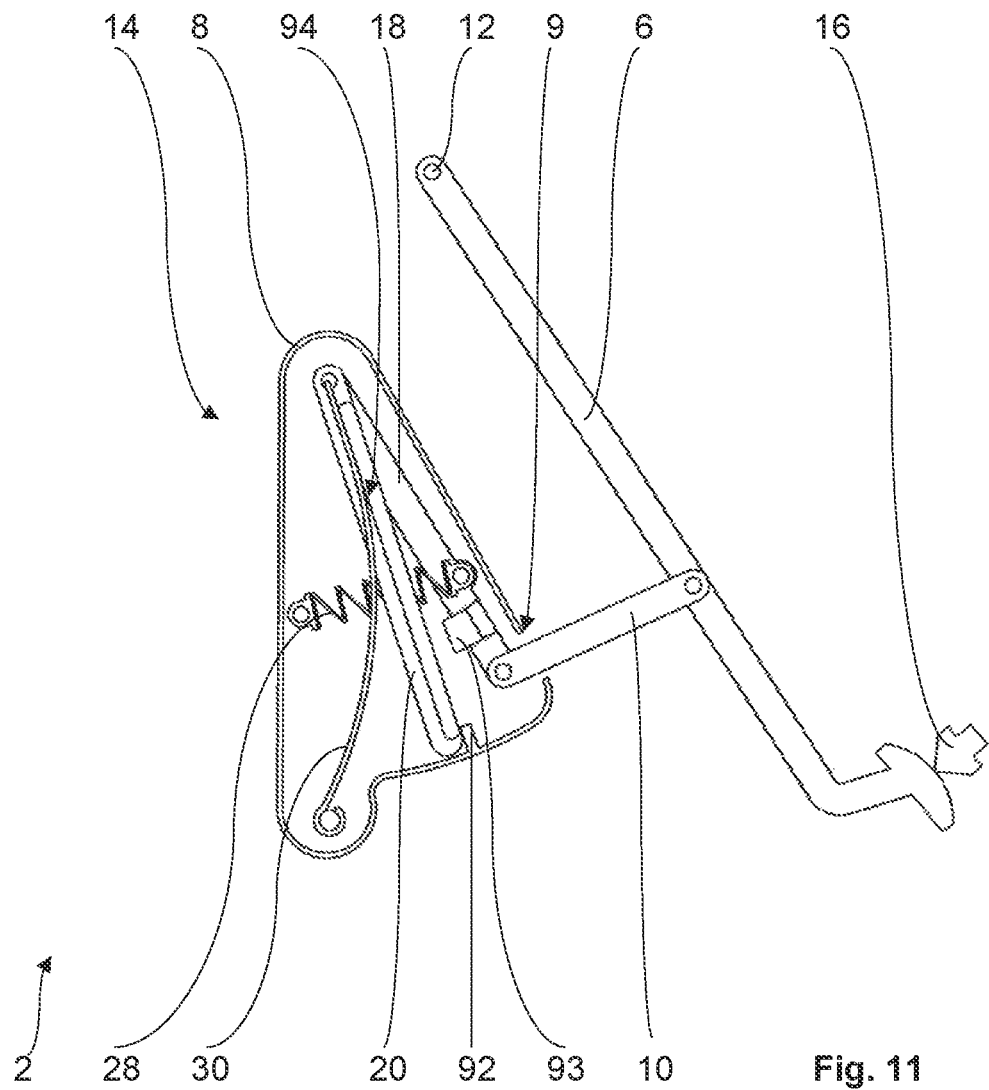
FIG. 11 is a tenth sample embodiment of the inventive pedal emulator in a crosssection side view with the pedal lever at a resting position.

FIG. 11 shows a tenth sample embodiment of the inventive pedal emulator in a cross-section side view. The pedal emulator 2 features a pedal lever 6 that is mounted on a rotary axis 12 so that it is pivotable around the rotary axis 12, where the rotary axis 12 is fastened to a base part of the pedal emulator 2 (not shown). Furthermore, in the present sample embodiment, the pedal emulator 2 features, for example in line with the first and the second sample embodiment, a housing 8 in which a force generation unit 14 is arranged. The force generation unit 14 features, for example in line with the first sample embodiment, a first lever 18 and a second lever 20, where the first lever 18 is connected in an articulated manner at one free end with a free end of a coupling element 10 in the form of a coupling rod. The coupling rod 10 is connected in an articulated manner at a free end opposite such free end with the pedal lever 6. For this purpose, the housing 8, for example in line with the first sample embodiment, features an aperture 9. With a free end facing away from the coupling rod 10, the first lever 18 is mounted so as to be pivotable to a rotary axis of the housing 8. The second lever 20 is also mounted in an articulated manner with a free end of the second lever 20 at this rotary axis of the housing 8. This is not absolutely necessary, however. Correspondingly, the second lever 20 can also be mounted at a rotary axis of the housing differing from this rotary axis. With a free end opposite this rotary axis of the housing 8 at which, in the present sample embodiment, both the first lever 18 and the second lever 20 are mounted in an articulated manner, the second lever 20 rests against a stop 92 formed at the housing 8 in the resting position shown in FIG. 11, which is explained in more detail in the following.

The first lever 18 features a carrier 93 for the second lever 20. By means of the carrier 93, the first lever 18 comes into force transmission connection with the second 20 as of a previously completed pedal travel of the pedal lever 6. i.e. after completing a first section of movement of the pedal lever 6. Correspondingly, the first lever 18 and the second lever 20 are initially not linked by a force transmission connection when the pedal lever 6 is moved, i.e. when it is rotated around the rotary axis 12, starting at the resting position shown in FIG. 11. Only after completing a previously defined pedal travel of the pedal lever 6, i.e. with increasing pedal travel, does the first lever 18 come into force transmission connection with the second lever 20 by means of its carrier 93. The first lever 18 is connected in an articulated manner to a first spring 28 taking the form of a coil spring. For this purpose, the first spring 28 is mounted at one end at a bearing point of the first lever 18. The first spring 28 is mounted in an articulated manner at a bearing point of the housing 8 with one of its free ends opposite said bearing point. Furthermore, the force generation unit 14 features a second spring 30 in the form of a leaf spring that is mounted at a free end so as to be pivotable to a rotary axis of the housing 8 and is linked in force transmission connection at a free end opposite said free end to the second spring 20. For this, see the arrow 94 that marks in FIG. 11 the point of applied force of the second spring 30 at the second lever 20. In this context, the second spring 30 is permanently connected to the second spring 20 and pretensioned. In the present sample embodiment, the first spring 28 and the second spring 30 are arranged parallel to each other, i.e. designed as a "parallel connection" of springs 28, 30. The aforementioned stop 92 is required on account of the pretension of the second lever 20 by the second spring 30.

If the pedal lever 6 is now actuated by a user (not shown), i.e. the user exerts an actuating force 16 on the pedal lever 6, the pedal lever 6 rotates clockwise around the rotary axis 12 starting with the resting position shown in the image plane of FIG. 11. The pedal lever 6 is deflected from its resting position and then completes a pedal travel. In doing so, the pedal lever 6 presses the coupling rod 10 against the first lever 18, where the first spring 28 is compressed. As the pedal travel increases further, i.e. with increasing actuation of the pedal lever 6, the first lever 18 comes into force transmission connection with the second lever 20 by means of its carrier 93, such that from this position of the pedal lever 6, i.e. as the pedal travel of pedal lever 6 further increases, the second lever 20 is actuated alongside the first lever 18, where the second lever 20 presses against the second spring 30 and the latter is correspondingly compressed. In doing so, the point of applied force 94 of the second spring 30 moves in the direction of the stop 92 at the second lever 20. This increases the effective leverage of the second lever 20 and thus the effective torque. Furthermore, the spring force of the second spring 30 designed as a leaf spring increases. Correspondingly, the present embodiment of the inventive pedal emulator 2 permits the generation of a gradual progression of a counterforce as the pedal travel increases, i.e. with increasing actuation of the pedal lever 6 by means of actuating force 16.

Figure 12:
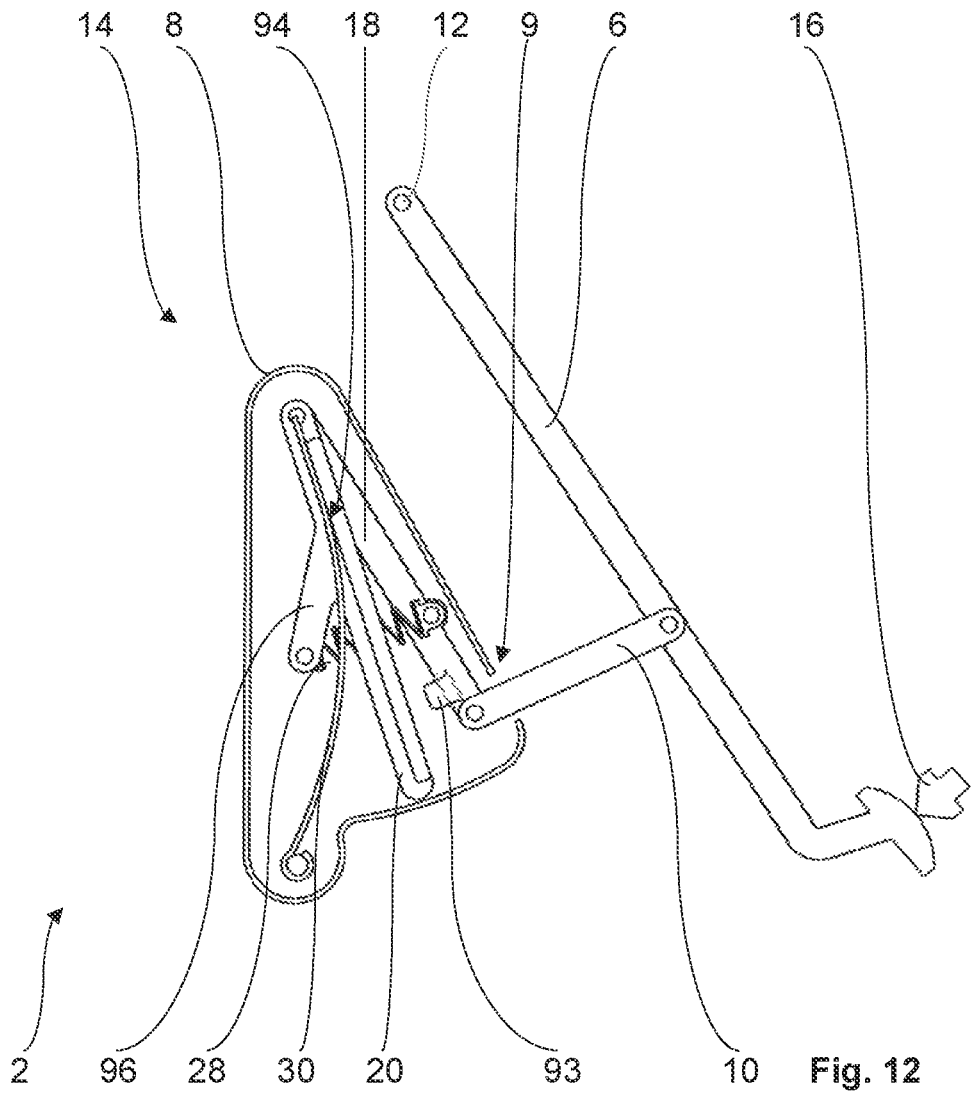
FIG. 12 is an eleventh sample embodiment of the inventive pedal emulator in a cross-section side view with the pedal lever at a resting position.

FIG. 12 shows an eleventh sample embodiment as an alternative to the tenth sample embodiment, where the designs of the two sample embodiments are essentially comparable. Differing from the tenth sample embodiment, the first spring 28 in the eleventh sample embodiment does not bear on a bearing point of the housing 8 with a free end, but the first spring 28 bears on a bearing point of an arm 96 formed at the second lever 20. Correspondingly, there is no arrangement in parallel of springs for the first spring 28 and the second spring 30 but an arrangement in series of the first spring 28 with the second spring 30. Furthermore, FIG. 12 also shows the carrier 93 of the first lever 18 for carrying along the second lever 20 as of a previously completed pedal travel of the pedal lever 6. As soon as the carrier 93 comes into contact with the second lever 20 so as to transmit force as of a certain position of the pedal lever 6, i.e. after completing a previously defined pedal travel of the pedal lever 6, the first spring 28 is not compressed any further. If the pedal travel increases any further, only the second spring 30 will be compressed.

Figure 13:
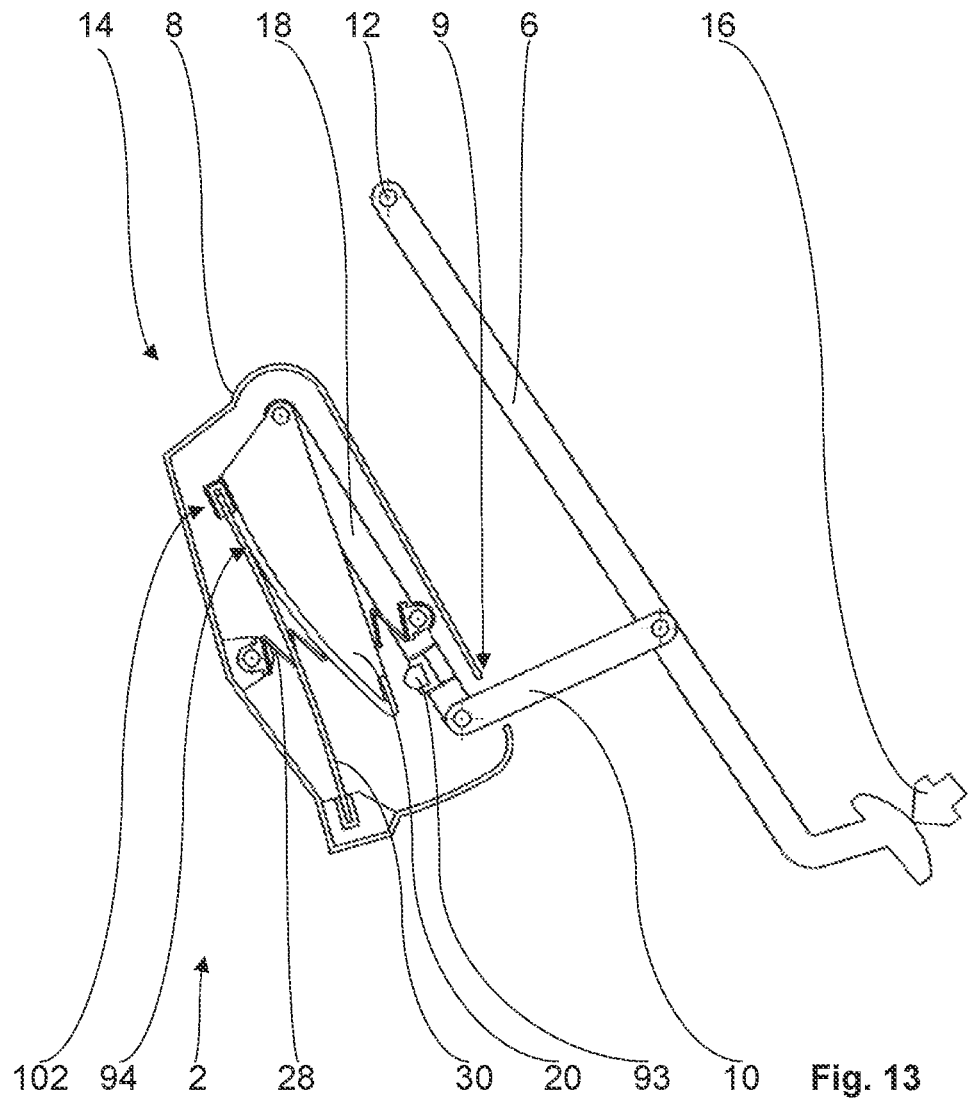
FIG. 13 is a twelfth sample embodiment of the inventive pedal emulator in a cross-section side view with the pedal lever at a resting position.

An alternative to the two last-mentioned sample embodiments can be seen from FIG. 13 which shows a twelfth sample embodiment of the inventive pedal emulator. The general design of the pedal emulator 2 in accordance with the present sample embodiment is likewise comparable with the tenth sample embodiment. Differing from this, the second lever 20 features an aperture for the first spring 28 (not shown). Furthermore, the second spring 30 in the form of a leaf spring is designed with a slit so that, among other things, the first spring 28 can be guided through the second spring 30. Furthermore, the second spring 30 is securely clamped on one side by a free end to a bearing point of the housing 8 and is mounted by a free end opposite this free end in an articulated manner in a guide 102 of the second lever 20 designed as a longitudinal guide. For example, the chosen manner of clamping the second spring 30 can be used to generate in the desired manner the hysteresis in the inventive pedal emulator 2 in accordance with the tenth to twelfth sample embodiment. In addition, the carrier 93 in the twelfth sample embodiment is designed as an elastic element, for example as a rubber part. This also makes it possible to design the progression of the counterforce in a pedal travel-counterforce diagram (not shown).

A modular design of the inventive pedal emulator 2 is made possible by the housing 8 in the tenth through twelfth sample embodiments, for example in line with the first sample embodiment. The coupling rod 10 provides for a uniform interface to pedal lever 6 for a plurality of possible embodiments and potential applications. Likewise, the progression of the counterforce in a pedal travel-counterforce diagram (not shown) of the inventive pedal emulator can be designed in a very simple and flexible manner. This can be achieved, for example, by exchanging the first and the second spring 28, 30. The possibility of adjusting the sheet thickness and adjusting the contour of leaf springs, i.e. their width and whether the leaf spring is designed with a slit or not, provide leaf springs in particular with a high degree of flexibility. Furthermore, leaf springs provide high force absorption and can at the same time be installed in compact spaces. A series arrangement of the first and second springs additionally offers a gradual progression of the counterforce, essentially without any identifiable surges.

The sample embodiments of the inventive pedal emulator explained as examples above clearly show the flexibility of the inventive pedal emulator for generating a desired progression of a counterforce in a pedal travel-counterforce diagram in order to generate a corresponding pedal feeling for a user of the vehicle and thus of the inventive pedal emulator with which the vehicle has been equipped.

The invention is not limited to the present sample embodiments. For example, the inventive pedal emulator can also be deployed advantageously with other pedals for vehicles. Similarly, the individual mechanical means can be selected at will within wide suitable limits in terms of type, functioning, material, shape dimensions, arrangement and number. A specialist will make the corresponding choice depending on the requirements of each individual case.

LIST OF REFERENCE NUMBERS

2 Pedal emulator, designed as a brake-by-wire pedal, specifically as a brake pedal
6 Pedal lever
8 Housing of the force generation unit 14

9 Aperture in the housing 8
10 Coupling element
12 Rotary axis for the pedal lever 6
14 Force generation unit
16 Actuating force
18 First lever
20 Second lever
22 Rotary axis of the first lever 18
24 Guide block of the second lever 20
26 Slotted guide for the second lever 20, designed as a linear guide
28 First spring
30 Second spring
32 Free surface of the second lever 20
34 Contact between the first lever 18 and the second lever 20
36 Slotted guide of the pedal lever 6
37 Guide block of the coupling rod 10
38 Central area of the coupling rod 10
40 Arm of the coupling rod 10
42 Arm of the coupling rod 10
44 Slide bearing socket for the coupling rod 10
46 Tappet of the force generation unit 14
48 Piston of force generation unit 14
50 Central area of the first lever 18
52 Arm of the first lever 18
54 Arm of the first lever 18
56 Slide bearing socket of the first lever 18
57 Further coupling element
58 Bearing for the further coupling element 57
59 Third spring of the further coupling element 57
60 Sleeve of the further coupling element 57
62 Mounting part of the further coupling element 57
64 Stop of the further coupling element 57
65 Slotted guide
66 Further arm formed at pedal lever 6
68 First longitudinal guide of coupling rod 10
70 Second longitudinal guide of coupling rod 10
72 Bolt
74 Guide block of the first spring 28
76 Rotary axis of the coupling element in the form of a coupling rod 10
78 Slotted guide of housing 8 for the tappet 46, designed as a slotted guide
80 Bearing point of the housing 8
82 Guide of the housing 8, designed as a free surface
84 Crossbar of the tappet 46
86 Clearance of the slotted guide 78, between the housing 8 and the tappet 46
88 First bolt
90 Second bolt
92 Stop of the housing 8
93 Carrier of the first lever 18 for carrying along the second lever 20
94 Point of applied force of the second spring 30 at the second lever 20
95 Arm of the second lever 20
102 Guide of the second lever 20 for the second spring 30, designed as a longitudinal guide

The invention claimed is:
1. A pedal emulator for a vehicle, the pedal emulator comprising:
a base part for mounting the pedal emulator to a structure of the vehicle;
a pedal lever pivotable around a rotary axis of the base part;
a force generation unit for exerting a counterforce on the pedal lever via at least one coupling element for mechanically coupling the force generation unit with the pedal lever;
wherein the counterforce acts counter to an actuating force exerted on the pedal lever;
wherein the force generation unit and the at least one coupling element are designed and arranged in such a way that a progression of the counterforce along a pedal travel of the pedal lever takes the form of a non-linear progression in a pedal travel-counterforce diagram;
wherein the force generation unit and the at least one coupling element for generating the non-linear progression of the counterforce along the pedal travel feature a plurality of solely mechanical mechanisms;
wherein the plurality of solely mechanical mechanisms includes a plurality of springs, wherein a first spring and a second spring of the plurality of springs are connected together in parallel or connected together in series;
wherein at least one spring of the plurality of springs acts together with a plurality of levers to transmit force, wherein the plurality of levers are designed for achieving a direct, or in the case of a coupling element designed as a lever, indirect force transmission connection with the pedal lever; and
wherein the plurality of levers is designed and arranged in such a way that the plurality of levers are not linked to each other in a force transmission connection in a first section of movement of the pedal lever and are linked to each other in a force transmission connection in a second section of movement of the pedal lever.
2. The pedal emulator in accordance with claim 1, wherein at least the first or the second spring takes the form of a leaf spring.
3. The pedal emulator in accordance with claim 1, wherein the first spring and the second spring each act together with the plurality of levers to transmit force.
4. The pedal emulator in accordance with claim 1, wherein at least one lever of the plurality of levers features at least one longitudinal guide for another one of the plurality of solely mechanical mechanisms.
5. The pedal emulator in accordance with claim 1, wherein at least one lever of the plurality of levers features a carrier for carrying along at least one other lever of the plurality of levers.
6. The pedal emulator in accordance with claim 1, wherein the pedal emulator features at least one stop for at least one lever of the plurality of levers.
7. The pedal emulator in accordance with claim 1, wherein the plurality of solely mechanical mechanisms feature a guide, wherein the guide takes the form of a slotted guide or a free surface.
8. The pedal emulator in accordance with claim 7, wherein the guide takes the form of a slotted guide into which a guide block engages.
9. The pedal emulator in accordance with claim 8, wherein the guide block is arranged at one free end of the at least one spring.
10. The pedal emulator in accordance with claim 8, wherein the guide block is arranged at at least one of the at least one coupling element or at least one lever of the plurality of levers.
11. The pedal emulator in accordance with claim 7, wherein the guide takes the form of a free surface that engages with at least one lever of the plurality of levers.

12. The pedal emulator in accordance with claim 1, wherein the force generation unit includes a device to reduce or avoid lateral forces acting crosswise to a main force direction of the force generation unit.

13. The pedal emulator in accordance with claim 12, wherein the device features at least one spring acting crosswise to the main force direction of the force generation unit to reduce or avoid lateral forces.

14. The pedal emulator in accordance with claim 1, wherein at least one axis of at least one lever of the plurality of levers is oriented parallel to the rotary axis of the pedal lever.

15. The pedal emulator in accordance with claim 1, wherein the force generation unit includes at least one slide bearing for at least one of the at least one coupling element or at least one lever of the plurality of levers.

16. The pedal emulator in accordance with claim 1, wherein the force generation unit or the force generation unit together with the at least one coupling element is a separate assembly.

17. The pedal emulator in accordance with claim 16, wherein the separate assembly features a housing, wherein the force generation unit is arranged in the housing and is transferable, linked by a force transmission connection with the pedal lever, by an aperture in the housing and the at least one coupling element.

* * * * *